United States Patent [19]
Culley

[11] Patent Number: 5,159,679
[45] Date of Patent: Oct. 27, 1992

[54] COMPUTER SYSTEM WITH HIGH SPEED DATA TRANSFER CAPABILITIES

[75] Inventor: Paul R. Culley, Cypress, Tex.

[73] Assignee: Compaq Computer Corporation, Houston, Tex.

[21] Appl. No.: 378,579

[22] Filed: Jul. 10, 1989

Related U.S. Application Data

[63] Continuation-in-part of Ser. No. 243,480, Sep. 9, 1988, Pat. No. 5,058,005.

[51] Int. Cl.$^5$ ................. G06F 12/00; G06F 13/00
[52] U.S. Cl. .............................. 395/425; 395/500; 395/550
[58] Field of Search ............ 365/233, 230.01, 189.01

[56] References Cited

U.S. PATENT DOCUMENTS

| | | | |
|---|---|---|---|
| 4,479,180 | 10/1984 | Miller | 364/200 |
| 4,644,463 | 2/1987 | Hutchkin et al. | 364/200 |
| 4,937,734 | 6/1990 | Bechtolsheim | 364/200 |
| 5,034,917 | 7/1991 | Bland et al. | 365/235 X |
| 5,058,005 | 10/1991 | Culley | 395/425 |

OTHER PUBLICATIONS

IEEE, P1196 Specification–NuBus, Dec. 15, 1986, pp. 1–59.
IBM Corp., Personal Computer AT Technical Reference, First Edition, Sep. 1985, pp. 1-24 to 1-38.
IBM Corp., RT PC Hardware Technical Reference, vol. 1, Second Edition, Sep. 1986, pp. 6-4 to 6-28.
Intel Corporation, Microprocessor and Peripheral Handbook, vol. I, 8237A High Performance Programmable DMA Controller, 1988, pp. 2-234 to 2-252.
EISA Press Release, Sep. 13, 1988.
The Great Divide, EISA vs. MicroChannel; PC Magazine, Dec. 27, 1988, pp. 165-186.
IBM Corp., Personal System/2 Model 80 Technical Reference, First Edition, Apr. 1987, pp. 2-6 to 2-20; 2-77 to 2-113 and 3-15 to 3-27.
Compaq Computer Corp., D4 Page DRAM Board Schematics and timing diagrams.
EISA vs. MicroChannel: Multimasterin is the key, Electronic Design, Oct. 13, 1988.
H. Jessup, PCET 32-Bit Bus Specification, PCET Bus Development Committee, Jun. 9, 1986.
M. Vano, Personal Computer Extended Technology Bus Committee Alternate Bus Master Data Multiplexing Draft Subcommittee Report, Jun. 14, 1986.
M. Vano, Ambiguities in the IBM PC/RT and PC/AT Documentation (Re: Alternate Bus Masters), Jun. 15, 1986.
M. Fung, Extending at Bus Bandwidth, Chips and Technologies, May 21, 1986.

*Primary Examiner*—Alyssa H. Bowler
*Attorney, Agent, or Firm*—Pravel, Gambrell, Hewitt, Kimball & Krieger

[57] ABSTRACT

The present invention is a computer system which can perform master unit controlled memory accesses at a first rate, DMA controlled operations at a second rate and burst operations of both types at a higher third rate. The burst operation is set up by performing a standard access cycle, thus setting up the dynamic random access memory row address, and then performing a series of fast, column address-only accesses to the same page of memory. The fast mode must be exited to a standard rate access whenever a page boundary is crossed, with burst operations recommencing thereafter. Wait states can be inserted in all type operations. Thirty-two bit master units can downshift or step down to 16 bit operation to respond to 16 bit burstable responding units.

11 Claims, 12 Drawing Sheets

COMPUTER SYSTEM WITH HIGH SPEED DATA TRANSFER CAPABILITIES

This is a continuation-in-part of copending application Ser. No. 243,480, filed Sep. 9, 1988 now U.S. Pat. No. 5,058,005.

BACKGROUND OF THE INVENTION

1. Field of the Invention

The present invention relates to interface standards used within computer systems, and more particularly to interfaces or busses handling normal and high speed data transfers.

2. Description of the Prior Art

Microprocessors and the personal computers which utilize them have been becoming more powerful over the recent few years. Currently available personal computers have capabilities easily exceeding the mainframe computers of twenty to thirty years ago and approach the capabilities of minicomputers currently manufactured. Microprocessors having word sizes of 32 bits wide are now available, whereas in the past eight bits was conventional and sixteen bits was common.

Personal computer systems have developed over the years and new uses are being discovered daily. The uses are varied and, as a result, have different requirements for the various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system.

The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporation (IBM) personal computer, the IBM PC. The IBM PC utilized an Intel Corporation 8088 as the microprocessor. The 8088 has an eight bit, or one byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems, such as video output units or mass storage units, were not complex and also had relatively low performance levels because of the relative simplicity of the devices available at a reasonable cost at that time.

With these various factors and the component choices made in mind, an interface standard was developed and used in the IBM PC. The standard utilized 20 address lines and eight data lines, had individual lines to indicate input or output (I/O) space or memory space read or write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped and capacities and speeds increased. Performance rates and capacities of the mass storage subsystems increased, generally by the incorporation of hard disk units for the previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which were previously very complicated on the 8088.

It was desired that the existing subsystem circuit boards be capable of being used in the new AT, so the interface standard used in the PC was utilized and extended. A new interface standard was developed, which has become known as the Industry Standard Architecture (ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystem circuit board was capable of using the extended features. While the address values are presented by the 80286 microprocessor relatively early in an operation cycle, the PC interface standard could not utilize the initial portions of the address availability because of different timing standards for the 8088 around which the PC interface standard was designed. This limited the speed at which operations could occur because they were now limited to the interface standard memory timing specifications and could not operate at the rates available with the 80286. Therefore the newly added address lines included address signals previously available, but the newly added signals were available at an earlier time in a cycle. This change in address signal timing allowed operations which utilized the extended portions of the architecture to operate faster.

With the higher performance components available, it became possible to have a master unit other than the system microprocessor or direct memory access controller operating the bus. However, because of the need to cooperate with circuit boards which operated under the new sixteen bit standard or the old eight bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and on other master units. Additionally, the master unit was required to utilize the direct memory access controller to gain control of the bus, limiting prioritizing and the number of master units possible in a given computer system.

The capability of components continued to increase. Memory speeds and sizes increased, mass storage unit speeds and sizes increased, video unit resolutions increased and Intel Corporation introduced the 80386. The increased capabilities of the components created a desire for more use of master units, but the performance of a master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address. The local area network (LAN) concept, where information and files are stored on one computer called the server and distributed to local work stations having limited or no mass storage capabilities, started becoming practical with the relatively low cost of the high capability components needed for an adequate server and the low cost of the components for a work station.

An extension similar to that performed in developing the ISA could be done to fully utilize the 80386's capabilities but this extension would have certain disadvantages. With the advent of the LAN concept and the high performance requirements of the server and of video graphics work stations used in computer-aided design and animation work, the need for very high data transfer rates became critical. An extension similar to that performed in developing the ISA would not provide this capability, even if a slightly shorter standard cycle time was provided, because this would still leave the performance below desired levels.

SUMMARY OF THE INVENTION

A computer system incorporating the present invention can utilize the capabilities of the present computer components, has slightly shorter standard cycle times and has a mode for providing a very high rate data transfer to or from the system's memory. A computer system incorporating the present invention provides the increased address and data lines necessary to allow use of the full memory address range and 32 bit word width of the Intel Corporation 80386. New state indication and address control signals are provided on a new connector. The new signals are for use by units capable of operating on 8, 16 or 32 bit wide data and address buses and by new master units. The state indication and address control signals of the ISA standard are still utilized for operation with circuit boards that do not support the new extended architecture and specifications.

A first standard cycle rate is provided for DMA operations which utilize the extended standard and a second standard cycle rate is provided for all other memory operations which utilize the extended standard, whether by the central processing unit (CPU) or a master unit located on a circuit board. These standard cycle rates are based on a given number of synchronization signal cycles, generally three or four for DMA operations and two for other operations.

A third cycle rate is provided for all operations, wherein the cycle lasts only one synchronization signal cycle, allowing a very high data transfer rate, especially when it is understood that up to 32 bit wide information is being transferred. The third cycle, referred to as a burst cycle, allows utilization of the page mode operation of dynamic random access memories (DRAM's). DRAM's are constructed so that the array of transistors forming the storage cells are in a rectangular formation, with resulting row and column addresses used to select a given storage cell. This use of row and column addressing has been carried over to the physical connectors to the memory device to allow multiplexing of the address values and the resulting reduction in device size. Conventionally, the row address is asserted first, with the column address being asserted second. In page mode operation the row address is set and a series of column addresses are presented, thus selecting a series of storage cells on a single row, referred to as a page. When using the burst cycle the row and column addresses are set in a first setup cycle with standard cycle times, the remaining operations are performed at the third cycle rate because the row address need not be changed, only the column address. Of course, static random access memories, with their faster cycle times, or other fast devices could also be utilized as the memory devices, but the cost of such a design would generally be higher than one using the relatively inexpensive DRAM's.

In this manner a very high transfer rate can be developed between memory and the unit controlling the bus and yet allow the use of relatively inexpensive components.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 243,327, entitled "Multiple Word Size Computer Interface with Master Capabilities" by Paul R. Culley, filed on Sep. 9, 1988;

U.S. application Ser. No. 378,580, entitled "Computer System With Simplified Master Requirements" by Paul R. Culley, filed on Jul. 10, 1989;

U.S. application Serial No. 242,728, entitled "Extended Input/Output Circuit Board Addressing System" by Paul R. Culley and Montgomery McGraw, filed on Sep. 9, 1988;

U.S. application Ser. No. 242,954, entitled "Programmable Interrupt Controller" by Paul R. Culley, and Montgomery McGraw, Karl N. Walker and Lazaro D. Perez, filed on Sep. 9, 1988;

U.S. application Ser. No. 242,734, entitled "Method and Apparatus for Configuration of Computer System and Circuit Boards" by Curtis R. Jones, Jr., Robert S. Gready, Roberta A. Walton, Scott C. Farrand, Daryl George and Michael Griffin, filed on Sep. 9, 1988; and U.S. application Ser. No. 293,315, entitled "Method and Apparatus for Configuration of Computer System and Circuit Boards", by Curtis R. Jones, Jr., Robert S. Gready, Roberta A. Walton, Scott C. Farrand, Daryl George and Michael Griffin, filed on Jan. 4, 1989, all of which are assigned to the assignee of this invention.

Figure 1:
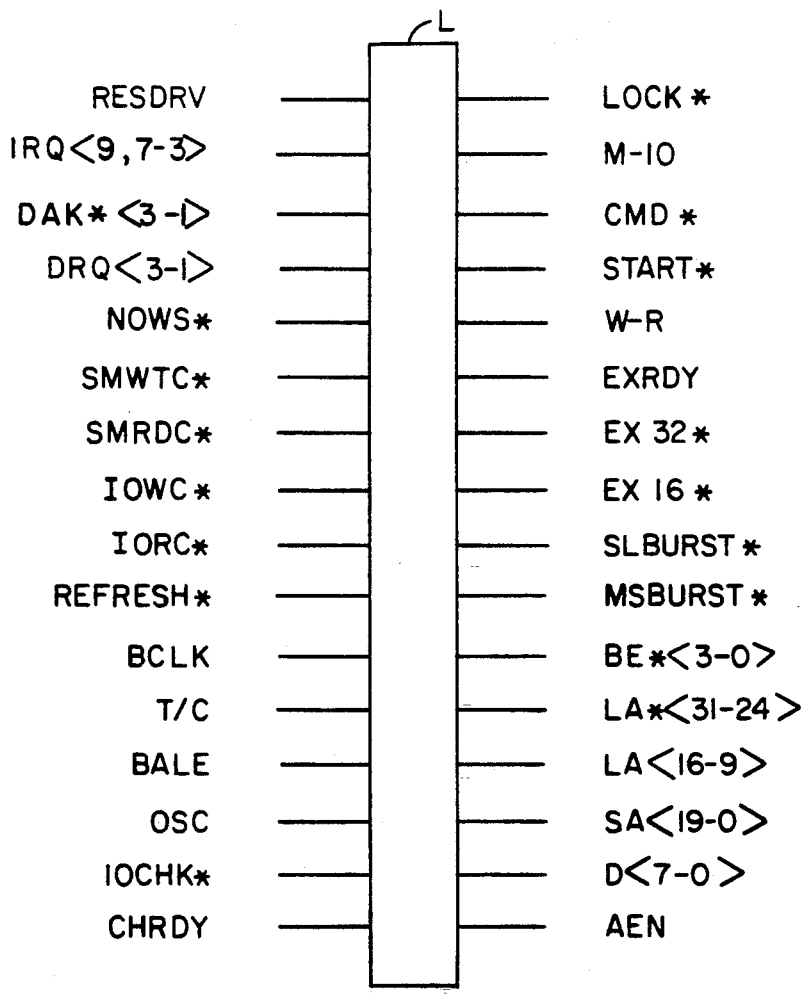
FIG. 1 is a diagram illustrating the connectors and signals of a computer system incorporating the present invention.
Figure 1:
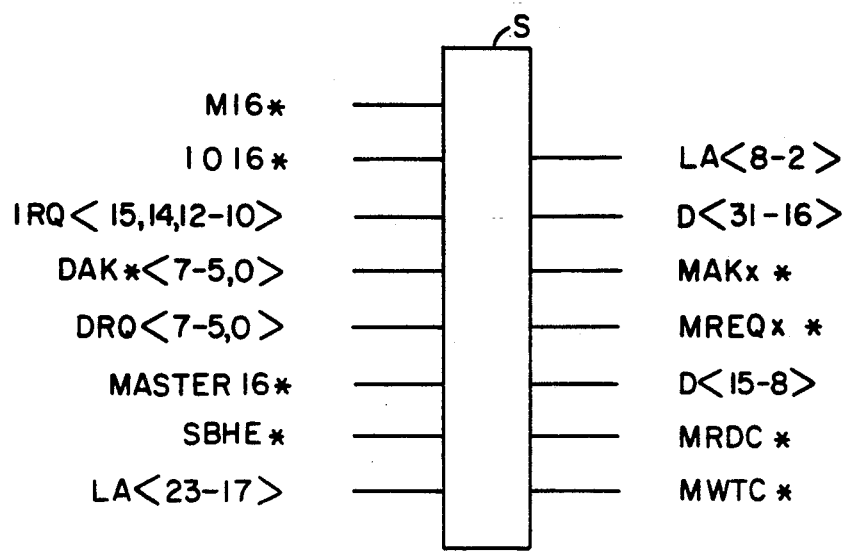

A computer system incorporating the present invention has a system board which has a number of locations or slots for inclusion of interchangeable circuit boards. Each location preferably has two connectors, a long connector L (FIG. 1) corresponding to the 8 bit IBM PC standard connector and including additional signals and a short connector S, corresponding to the sixteen bit connector and including additional signals. Each connector L or S has included a series of lines which are designated for carrying various signals, which are the logical representation of the desired function and generally have the same identification mnemonic. The signals associated with the connectors L and S are shown with the respective connectors in FIG. 1. The various power and ground lines included in each connector are not shown for reasons of clarity. The various lines are connected to each connector L and S at each location, so that a bus results, unless otherwise noted. This is the bus which is generally referred to in this specification. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields.

Various mnemonics are assigned to the signals and each of the signals has a given logical meaning. The logical meanings of various signals illustrated in FIG. 1 will be explained at this time. The SA<19-0> signals are the 20 bits of address information originally provided in the IBM PC. Generally, the new addressing information is enabled onto these lines when the valid address signal BALE, for address latch enable, is high. The addressing information present on the SA lines is latched by the system board when the BALE signal goes from a high to a low state. These SA address lines are provided in addition to the address lines LA*<31-24>, LA<23-17>, LA<16-9>, and LA<8-2> which are for use with the early or pipelined address values presented by the system microprocessor if it is an 80286 or 80386. The addressing information is available on the LA lines for a period of time before the information is available on the SA lines, thereby allowing faster operation of the various circuit boards which utilize these lines and signals. While the top 8 LA signals are inverted or low true, in the remaining portions of this specification they will be indicated as high true for ease of explanation, the proper signal level being understood. Four additional addressing signals, which are referred to as the byte enable signals BE*<3-0> are also present. These signals are provided by the 80386 to indicate which byte or bytes of the 32 bit double-word is desired and are used to complete the address value and must be fully utilized by any extended standard devices, either master or slave.

The 32 data lines present in the computer system are the signals or lines referred to as D<7-0> on the large connector L, D<15-8> available on the small connector S, and D<31-16> present on the small connector S.

Numerous interrupt request lines were present on the connectors in an ISA standard system and are retained on the large and small connectors L and S to allow the various circuit boards to present interrupts to the system board when necessary. These interrupt signals are identified as IRQ<9,7-3>, and IRQ<15,14,12-10> on the connectors L and S, respectively.

The computer system can perform direct memory access (DMA) functions wherein information is transferred directly from an I/O space location contained on a circuit board or system board to a memory space location contained on another circuit board or on the system board. Lines must be available to allow signals to indicate when information is available for transfer, so that control of the bus can be transferred to the DMA controller. Additionally, lines must be available to allow a signal to indicate when a DMA request is acknowledged. The DMA request signals DRQ<1-3> and DRQ<0> and DRQ<7-5> are supplied on the similarly identified lines to present the DMA requests. The acknowledgements of the various requests, which are granted to indicate that the specific requesting device may operate, are identified as the DAK*<1-3>, DAK*<0>, and DAK*<7-5> signals and lines. A T/C line is provided on the large connector L to allow indication that the terminal count or last count of a DMA operation has been reached.

In the ISA standard, a master unit had to issue a DMA request to obtain control of the bus. The master unit then awaited for the acknowledgment signal, at which time the master unit took the MASTER* signal low, indicating that a master unit was controlling the bus. The presence of this signal disabled any devices or circuitry which would otherwise normally be presenting address and control information on the bus, such as the DMA controller. Because this circuitry was cumbersome and did not allow sufficient prioritizing and control scheduling, master unit request and master unit request acknowledgment signals are provided in the small connector S. These signals are referred to as MREQx* and MAKx*, where the "x" refers to the specific location or slot of the connector. The addition of these signals provides a manner of changing and adding flexibility to the prioritization of master unit requests and allows the DMA channels to be reserved for more conventional direct memory access type operations. The MASTER* signal has been retained, but has been renamed MASTER16* and has additional functions relating to indicating the data width of a master unit utilizing the extended standard.

Because of the costs of various types of memory, personal computer systems generally utilize dynamic random access memory for the main memory systems. Dynamic random access memory (DRAM) is generally available at a significantly lower cost per bit than static random access memory and therefore has allowed the development of the personal computers having very large amounts of memory. However, the DRAM's electrical charge must be periodically refreshed or they will lose the stored information. To facilitate this refreshing operation, a REFRESH* signal is present on the large connector L to indicate that the refresh operation is occurring. The presence of this signal indicates that the various address lines and control signals are operating in the refresh mode to allow the refreshing of the entire system memory at one time.

A reset signal is provided on the large connector L and is referred to as RESDRV. The presence of this signal allows the various circuit boards to be reset during power-up operations.

Because computers generally operate in a synchronized relationship where events must occur in relationship to a controlling signal, a synchronizing clock is generally necessary and is provided in this case by the BCLK signal provided on the large connector L. For purposes of this description, the BCLK signal has a frequency between 6.0 MHz and 8.333 MHz, with a nominal value of 8.0 MHz, and has a nominal duty cycle of 50%. This synchronizing signal is different than the OSC signal, which is provided for timing applications and has a frequency of 14.31818 MHz and a duty cycle of approximately 50%. The OSC signal is not synchronized, but is provided for general clocking features, whereas the BCLK signal is synchronized to the microprocessor's system clock and is used as the reference for interface signal timing requirements.

A signal referred to as the AEN signal is provided on the large connector L to indicate to the circuit boards that the DMA controller is in control of the bus. One of the functions of this signal is to indicate to an I/O device that it must not respond to the other signals being presented on the bus. However, the AEN signal is not used by a circuit board when that board must respond to a DMA operation. This DMA response need is determined by coordinating the DMA acknowledged signal DAK* with the AEN signal, so that if the circuit board's DAK* signal is high, indicating that it is not being accessed, then when the AEN signal is high any addressing information is not utilized.

An IOCHK* line is provided on the large connector L to signal the system about parity or other serious errors which have occurred on the circuit boards plugged into the various connectors. This signal is used when an uncorrectable error occurs so that further processing is not performed on any erroneous data.

On the large connector L a new line referred to as LOCK* is provided for interaction with circuit boards which contain local memory and local processing capability. The information stored in the local memory may be changed by the local processor at the same time that the local memory information is being requested by the device controlling the bus, thus resulting in the bus device receiving incorrect information. When the LOCK* signal is asserted low, the local processing devices cannot access the local memory, to prevent data values from changing between accesses by the device controlling the bus.

The remaining signals provided on the two connectors L and S are state indication and address control signals. The signals are used to indicate the operating state of the bus or the need for accessing to the various I/O or memory spaces. In general, the state indication and address control signals of the connectors L and S relating to conventional ISA operation are such that individual signals are presented to indicate whether a memory or I/O space operation read or write is being performed. For example, the MRDC* or SMRDC* signals are made active during a memory read cycle. The SMRDC* signal is enabled only when a memory read operation within the first 1 Mbyte of memory is occurring. In a similar manner, the MWTC* and SMWTC* signals are used to indicate a memory write operation, while the IORC* and IOWC* signals are used to indicate I/O space read and write operations, respectively. Any further references to the MRDC* and MWTC* signals will be assumed to include like operations to the SMRDC* and SMWTC* signals if the presented address is within the first 1 Mbyte of memory. Because the various I/O devices and memory devices have differing speeds, it is necessary for the bus controller to know whether a particular device can respond faster than a given normal rate or slower than a given normal rate. For this reason, a signal referred to as NOWS* is provided to indicate that no further wait states are necessary when addressing that particular device, and a CHRDY signal is provided to indicate that the particular device is not ready at that time.

A signal referred to as SBHE* is provided on the small connector S to indicate that the D<15-8> lines will be used in the data transfer. Two additional address control signals, referred to as M16* and I016*, are provided on the small connector S to indicate that an ISA standard 16 bit device will respond to the information request or cycle present on the bus. The M16* signal is developed from the use of the LA address signals and thus is presented early in a given cycle. The presence of either the I016* or M16* signal indicates both that the device will respond using a 16 bit data path and that the device can respond to a shorter standard cycle time than a device which can provide data only 8 bits at a time. This shorter standard cycle time is possible because of the various improvements in component speeds which occurred between the development of the IBM PC standard and the ISA standard. These state indication and address control signals represent the state indication and address control signals necessary for operation under the ISA standard and for operation with 8 and 16 bit wide ISA standard data. These signals are utilized by existing 8 and 16 bit circuit boards designed for operation with the IBM PC or ISA standards.

A wholly separate set of state indication and address control signals is provided for the extended standard. The START* and CMD* signals are provided for timing control in an extended cycle. The START* signal is asserted after the address has become valid and is generally deactivated after one full BCLK cycle time. The START* signal thus indicates the start of an extended cycle. The rising edge of the START* signal can be used to latch the address if desired. The CMD* signal is asserted low when the START* signal is deactivated and is generally continued at a low state until the end of the cycle, unless data assembly or distribution is necessary. Thus the START* and CMD* signals are basically used to indicate the beginning and end of an extended standard cycle, with various events happening in synchronization with the BCLK signal after the assertion of the START* or CMD* signals. M-IO and W-R signals are used to indicate whether a memory or I/O space cycle is being performed and whether the operation is a read or write operation in that given space. These two signals are used in contrast to the six signals provided in the ISA standard to indicate similar information. The M-IO signal must be used for decoding any cycle to determine if the cycle is to the memory or input/output space. A separate line used to indicate that an extended device or data is not ready is provided on the large connector L and is referred to as the EXRDY line. It is also necessary to know whether the addressed device will respond according to the extended standard using a 16 or 32 bit data path and this is determined by signals presented on the EX32* or EX16* lines.

Finally, two additional signals referred to as MSBURST* and SLBURST* are provided on the large connector 32. These signals are used to indicate that a memory burst operation may occur and is occurring, to allow very high throughput for certain operations. The operation of these two signals, in combination with the other appropriate signals will be explained in detail.

Thus it can be seen that there is a wholly separate set of state indication and address control signals provided for use by devices incorporating the extended standard as herein defined.

The proceeding is a summary of the various lines and signals which are present on the large and small connectors L and S. The operation of the present invention with master units, the DMA controller and the system board are illustrated in this description. The various events which occur will be explained in relation to both rising and falling edges of the BCLK signal as this is the synchronizing signal for the control sequences. For purposes of this description the central processing unit (CPU) of the system may be considered a master unit, particularly when addressing memory located in a connector location. While in the preferred embodiment the CPU does not generally perform memory burst operations according to the present invention, this is because the CPU interfaces with the main portion of the memory in a different manner than over the large and small connectors L and S and so does not need the capability. If the CPU must interface to the memory over the large and small connectors L and S, burst operations would be similar to those of a master unit, and thus a master unit is not limited to being located on a circuit board located in a slot, but can include the CPU. Master units located on circuit boards and the DMA controller utilize the signals present on the large and small connectors L and S to access memory, either memory located on a circuit board or the main portion of the memory in the preferred embodiment.

Described first will be the operation with regards to the various signals presented if a master unit is in control of the bus. After completing the description for the read and write operations for master units the description will proceed to a similar description of operation when the DMA controller is in the control of the bus. Cycle AA is assumed to commence at time 300. At this time the bus controlling master unit asserts the address line values to the LA lines and sets the M-IO signal, in this case to a memory state or high condition because burst operations can be performed only to memory spaces and are defined as not being performable, in the preferred embodiment, to the I/O space. Additionally at this time, the bus controlling unit may set the W-R line to the desired state, in cycle AA to the low state, or can delay this event until the next rising edge of the BCLK signal.

At the next rising edge of the BCLK signal at time 302, the W-R signal must be set to the appropriate state if not already done and the START* signal is made low, the CMD* signal is made high if it was low from a previous cycle and the data present on the data lines from the previous cycle is latched if the cycle was a read operation. Additionally at time 302 the BE*<3-0> values are asserted. The dashed line which appears vertically at time 300 and time 302 is used to indicate a cycle of the machine and is drawn slightly after it occurs for reasons of clarity. It is to be noted that the dashed line is not straight because the address-related signals are pipelined one-half BCLK signal cycle before the actual data controls to provide extra time to allow address decoding.

Proceeding to the next edge of the BCLK signal, which is a falling edge at time 304, the BALE signal is made high by the system board for use by circuit boards or responding units which utilize the ISA standard and not the extended standard. When the BALE signal goes high, the system board transfers the address values to the SA lines. Burst operations cannot be performed by any of these devices and therefore the timing diagrams do not show an example of a response by an 8 or 16 bit ISA device. Should an extended standard device not respond or one which cannot be responded to in a burst, either because the responding device cannot perform a burst operation or the responding device is narrower than those with which the master unit can cooperate, the burst cycle is not performed but instead a conventional cycle is performed as disclosed in the co-pending applications entitled "Multiple Word Size Computer Interface with Master Capabilities" and "Computer system With Simplified Master Requirements" which have been incorporated by reference.

Figure 2:
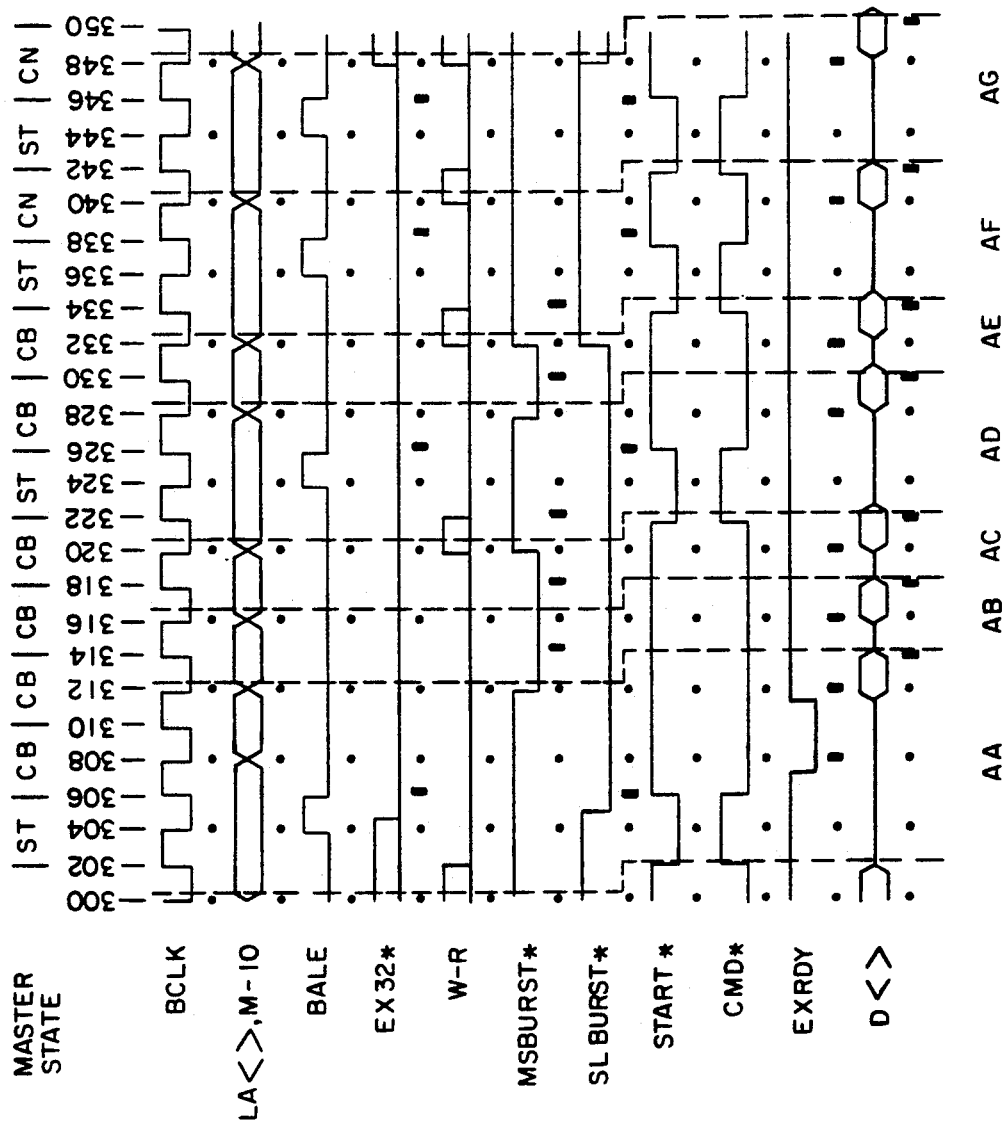
FIGS. 2-9 are timing diagrams showing the waveforms of various portions of a computer system incorporating the present invention.
Figure 3:
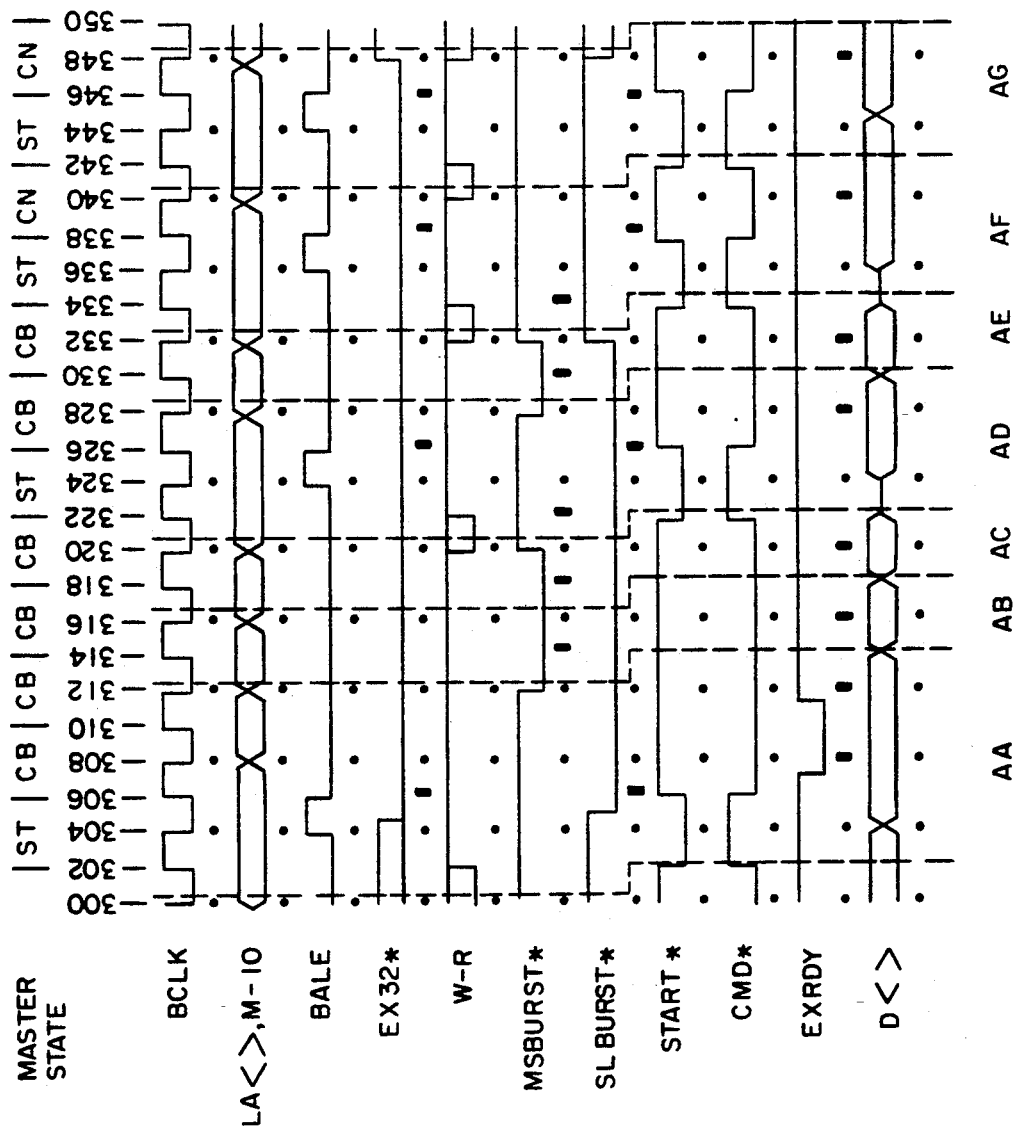
Figure 4:
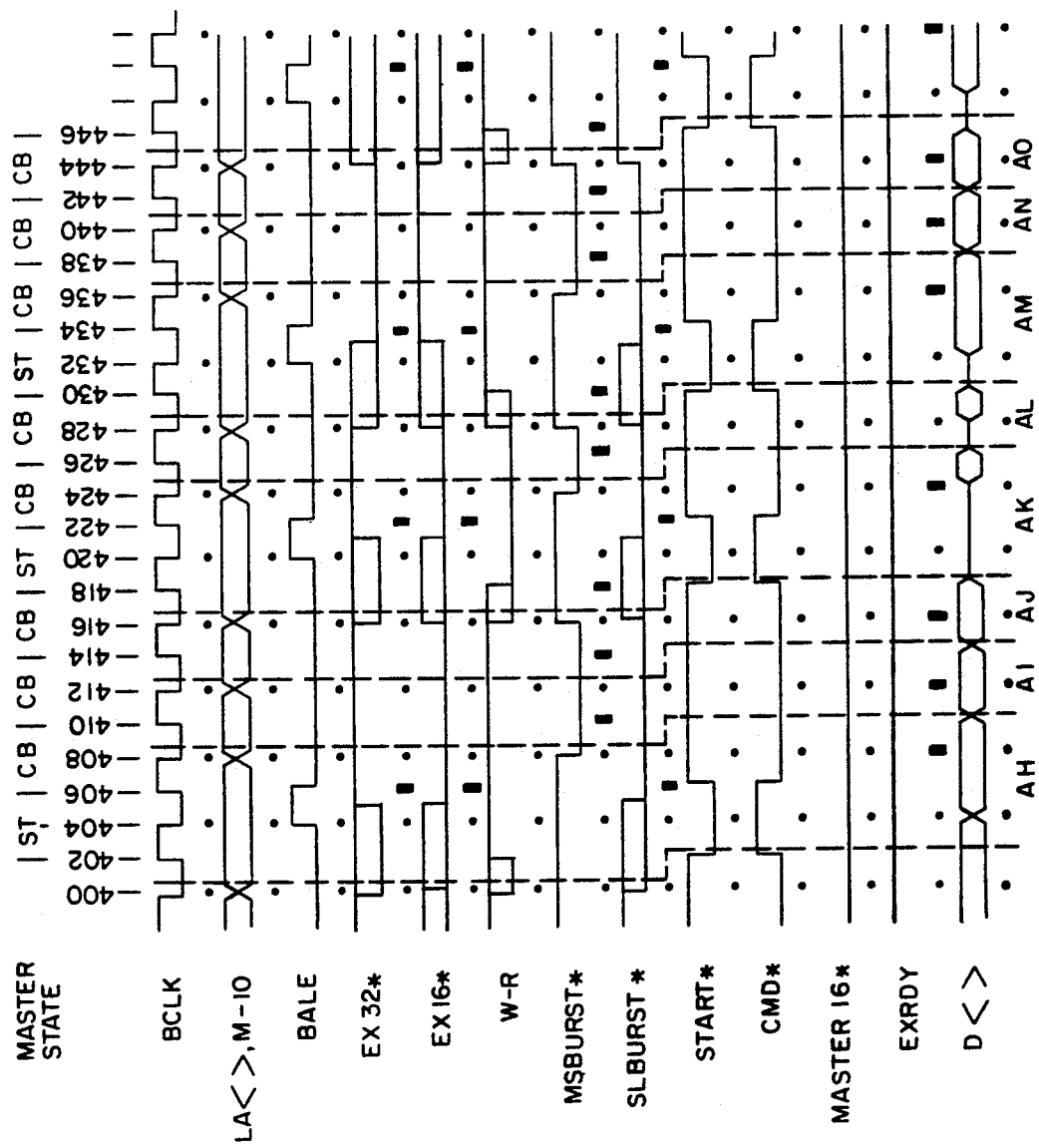

At a time prior to the next rising edge of the BCLK signal at time 306, the EX32* and SLBURST* signals must go low if they will be going low. The EX32* signal is used to indicate that a 32 bit device will be responding and thus which state information and address control signals will be utilized to transfer from the responding unit. FIGS. 2 and 3 are exemplary of 32 bit extended standard master units and responding devices, but similar timings are utilized with 16 bit extended standard master units and 16 or 32 bit extended standard responding devices, with the EX16* or EX16* and EX32* signals being monitored as appropriate. FIG. 4 shows 16 bit master unit timing. The SLBURST* signal is a signal which indicates that the particular responding device can perform burst operations and should always be asserted low if the device can respond. It is assumed that this can be done in the same operation as the memory decode and for that reason the timing shown in FIG. 2 is similar.

At time 306, the BALE signal is made low, causing the system board to latch the SA signal values until the next rising edge of the BALE signal. Additionally at time 306, the START* signal is made high and the CMD* signal is made low to indicate that the operation of cycle AA is proceeding. Also at time 306 the EX32* and SLBURST* are sampled to determine if the responding unit can burst and if it is of the proper width.

Prior to the next edge of the BCLK signal, which is a falling edge at time 308, the EXRDY signal must be low if it will be made low to indicate that the device will not be capable of responding to the operation without the need for additional wait states. In cycle AA as shown, the EXRDY signal does go low prior to time 308 so that a wait state will be inserted. The BCLK signal proceeds through the high to low transition at time 308 and the low to high transition at time 310. At time 308 the next address can be asserted on the LA and BE* lines or this presentation can wait until the wait states are completed. After time 310 and before the falling edge of the BCLK signal at time 312, the EXRDY signal is removed or raised to indicate that the device will now be able to respond. Time 312 is the end of the address phase of cycle AA so that the next address must asserted on the LA and BE* lines, the wait states being completed. Also at this time, the master unit lowers the MSBURST* signal to indicate that this is the beginning of a burst cycle and that the responding unit should so operate. During a burst cycle in the preferred embodiment the address lines LA<31-10> cannot change because the operation is defined such that this enables the responding device not to require the complete address to be enabled to the memory devices but instead only the column addresses need be activated. A page size of 1024 bytes is thus defined. This allows the responding unit to use conventional 256 kbit×1 or larger DRAM's in their page mode operation so that high cycle rates can be obtained using conventional, relatively inexpensive devices. The first cycle of a burst cycle, in this case cycle AA, must be a full length memory cycle because in that operation it is required that the row address be set up and this requires an additional BCLK signal cycle. After the row address is set up, the master unit may then proceed into burst mode. The master unit can provide any address within the page and need not sequentially change the address when in burst mode. Additionally, at any given address, the use of the BE*<3-0> signals allows any proper combination of the four bytes comprising the 32 bit double word or two bytes comprising the 16 bit word to be transferred at that address, thus allowing burst operations to begin and end on other than even double word boundaries and other specialized transfers to be performed.

Proceeding to time 314, the master unit samples the data lines to store the information which was available in cycle AA from the responding unit to complete cycle AA. At this time the responding unit begins preparing the data at the new address presented at time 312 for presentation to the data lines because the responding unit samples the MSBURST* signal to determine if a burst operation is commencing. The MSBURST* is then sampled at every rising edge of the BCLK signal, except those following assertions of EXRDY, to determine if the burst operation is continuing.

Time 316, the falling edge of the BCLK signal, is the end of the addressing portion of cycle AB in burst mode and therefore the new LA<9-2> signals are provided to the LA lines and the BE* lines are set as appropriate. Additionally, the EXRDY signal is sampled to determine if any wait states are needed. While it is preferable that wait states not be added, because a burst cycle with one wait state is the same length as a normal cycle without wait states, this capability is provided for flexibility. The EXRDY signal is sampled on each BCLK signal falling edge during a burst cycle. Proceeding to time 318, the master unit then samples the data lines to store the data which has been provided by the responding unit and the responding unit samples the MSBURST* signal. Therefore it can be seen that a burst cycle is only one BCLK signal cycle long, which in the preferred embodiment is 125 nanoseconds. With this cycle time operating on a 32 bit wide double-word, an effective throughput rate of 32 Mbytes per second results. It is to be noted that the START* and CMD* signals do not change state during the burst cycle, but instead remain at their level until the end of the cycle.

Proceeding now to the next falling edge of the BCLK signal at time 320 when new LA<31-2> values are presented, this is assumed to be an address which will exceed the page boundary limits so that the row address in the selected DRAM's must be changed. Therefore this, by necessity, must be a long cycle or erroneous information would be received. Because the preferred mode of operation for a responding unit will be to have the upper address bits latched so that only the lower address bits will be utilized in the short portions of a burst cycle, if burst mode is unexited, erroneous information will be obtained because the responding unit will cycle to the appropriate lower address location but on the wrong page. Therefore also at time 320, the MSBURST* signal is made high to indicate that this is not a burst cycle. Generally, when reference is made in this description to changing the address value, the BE*<3-0> lines are or can be changed as well as the LA lines, the BE*<3-0> effectively completing the full definition of the desired address in combination with the various data bytes desired. Generally during full address setup, when the LA<31-2> lines are being changed, the BE*<3-0> lines can be driven ½ BCLK signal later than the LA<31-2> values but when in burst mode the BE*<3-0> signals must change with the LA<9-2> signals. Additionally, the BE*<3-0> lines are driven as necessary on each cycle to obtain only the desired portion of the double word.

At time 322, the START* signal is made low and the CMD* signal is made high to indicate the beginning of a new memory cycle AD. Further at time 322, the data which was presented by the last read operation in the burst cycle AC is stored by the master unit. Additionally at time 322 the previous responding unit samples the MSBURST* to determine if the burst operation is continuing. In this case it is not, so the responding unit must perform a full cycle and perform the address decode operation and row address loading. Proceeding then to time 324, which is at the next edge of the BCLK signal, the BALE signal is made high in case an ISA standard device will be responding to this address. At time 326 the BALE signal is made low, the START* signal is made high, the CMD* signal is made low and the EX32* and SLBURST* signals are sampled. EXRDY has not been asserted by time 328, which is the next falling edge of the BCLK signal. Thus, this will be a cycle which completes without additional wait states and therefore at time 328 the new address is presented to the LA<9-2> and BE*<3-0> lines and, because a burst cycle is desired, the MSBURST* signal is made low. The example shown is illustrative of a case where a burst was desired and is responded to by a single responding unit, but the desired address range of the burst access crossed over a page boundary and therefore it was necessary to exit burst mode for one cycle to allow the row addresses to be set up.

At time 330 the data from cycle AD is stored by the master unit or bus controller and the responding unit samples the MSBURST* signal. Then at the falling edge of the BCLK signal at time 332 a new address is presented. In this case the illustrated example is such that this responding location cannot support a burst operation and therefore the SLBURST* signal goes high as soon as this address location is determined, for example, in FIG. 2 it is assumed to happen at time 332. At time 334, the W-R line must be in the desired state and the START* signal is made low, the CMD* signal is made high and the cycle AE data which is present on the data lines is stored by the master unit. This is the beginning of the data portion of cycle AF, which is a conventional read operation because the responding unit cannot perform a burst operation. The previous responding unit also samples the MSBURST* signal at this time. At time 336, the falling edge of the BCLK signal, the BALE signal is made high to allow address latching by ISA circuit boards. At time 338, the next edge of the BCLK signal, the BALE signal is made low. Additionally, the START* signal is made high and the CMD* signal is made low to indicate progression through the cycle. Also, the EX32* and SLBURST* signals are sampled. Because the SLBURST* signal is high, indicating that a burst cannot be maintained by the responding unit, the master unit will not lower the MSBURST* signal. At time 340, the address for the next cycle is presented on the LA lines because the EXRDY signal was not low prior to this edge. Then at time 342, the next edge of the BCLK signal, the W-R line must be in its desired state, the START* and CMD* signals are made respectively low and high and the cycle AF data on the data lines is stored. A similar cycle AG proceeds at times 344, 346, 348 and 350 where a conventional read cycle is performed because the SLBURST* signal is high indicating that the responding device cannot perform a burst operation and a standard two BCLK signal cycle memory operation is performed.

While FIG. 2 is illustrated as a read operation by a master unit, FIG. 3 illustrates the master unit writing to the responding unit. One primary difference is that the W-R signal remains high to indicate a write operation, whereas in the previous example of FIG. 2 the W-R line remained low to indicate a read operation. Further, the data is presented on the data lines differently. For example, the data from the preceding standard cycle remains on the data line until time 304, as is conventional to allow sufficient time for the data to be captured and to be compatible with previous ISA designs. During a burst cycle, the data is removed from the data lines one BCLK signal edge after the address is changed and not two edges as in non-burst cycles. This allows the data to be changed faster on the data bus to help support this fast mode of operation. For example, the data in cycle AA is presented at time 304 and removed at time 314, while the data for cycle AB is presented at time 314 and removed at time 318. The data for cycle AC is presented at time 318 and removed at time 322 while the data for cycle AD is presented at time 324, so that a one-half BCLK signal cycle float appears on the data lines. The data is then removed from the data lines at time 330 with the new data being presented at that time for cycle AE with the cycle AE data being removed at time 334. The remaining portions are conventional cycles.

The timing diagram for a 16 bit extended standard master unit is shown in FIG. 4. At time 400, a falling edge of the BCLK signal, the address values are presented on the LA<31-2> lines and the M-IO signal is set high to indicate a memory space operation. At this time or at time 402, the next rising edge of the BCLK signal, the W-R signal is set high. At time 402, the W-R signal is set to a high condition in the given example, indicating that a write operation will be occurring. Also at time 402, the START* signal is made low and the CMD* signal is made high to indicate that the address portion of cycle AH is beginning. During this cycle the MASTER16* signal is low, indicating that a 16 bit extended standard master is in control of the bus. It is noted that this signal is kept low at all times while the 16 bit extended standard master is in control of the bus. At time 404, the next falling edge of the BCLK signal, the BALE signal is made high and any previous data which had been presented on the data lines during a write operation is removed. At time 404 the master unit begins placing the new data on the data lines so that the responding device can begin receiving the data. Prior to time 406, the next rising edge of the BCLK signal, the EX32*, EX16*, and SLBURST* signals must be set. In this case a 16 bit extended standard device is responding and it is capable of bursting so that the EX32* signal is high and the EX16* and SLBURST* signals are low.

At time 406, the BALE signal is made low, the START* signal is made high, the CMD* signal is made low and the EX32*, EX16* and SLBURST* signals are sampled to determine if a bursting operation can occur and the width of the responding device. At time 408, the falling edge of the BCLK signal, the next address values are presented onto the LA<9-2> and BE*<3-0> lines because a burst operation will commence. Also at time 408, the MSBURST* signal is lowered to indicate to the responding unit that a burst operation is in progress. Finally at this time, the master unit samples the EXRDY signal to determine if a wait state will be added. In this case the EXRDY signal is high, so no wait states will be added. Time 408 is the beginning of the address phase of cycle AI. At time 410, the next rising edge of the BCLK signal, the responding unit samples the data on the data lines and the data of cycle AI is presented. Additionally, the responding unit samples the MSBURST* line and determines that a burst operation is occurring. At time 412, the master unit presents the next address on the LA<9-2> lines and samples the EXRDY signal and determines that no wait states are necessary. At time 414, the next rising edge of the BCLK signal, the responding unit again samples the MSBURST* line and latches in the data which has been presented by the master unit, which then changes the data on the data lines at this time. It is noted that these transfers are only 16 bit transfers because the master unit is a 16 bit device. This completes the data portion of cycle AI and initiates the data portion of cycle AJ.

At time 416, the falling edge of the BCLK signal, the master unit determines that the next address results in a page break so that a full cycle must be initiated. At time 416 the EXRDY signal is sampled. Because the EXRDY signal is asserted high, no wait states are necessary. Also at this time 416, because a burst is terminating, the MSBURST* signal is raised so that the responding unit can determine that the burst operation is completed. At time 418, the next rising edge of the BCLK Signal, the master unit removes the data from the data bus, which the responding unit has just sampled. Also at this time the responding unit samples the MSBURST* signal and determines that a burst operation is completed. At this time the START* signal is made low by the master unit and the CMD* signal is made high, indicating the completion of the burst cycle and the beginning of a new operation. Also finally at time 418, the W-R signal is made low, indicating in the preferred embodiment that this is a read cycle which is commencing. Control proceeds so that at time 420, the falling edge of the BCLK signal, the BALE signal is made high. Prior to the rising edge of the BCLK signal at time 422, the EX32*, EX16* and SLBURST* signals must be valid. In this case a 16 bit device will be responding and it will be capable of bursting so that the EX16* and SLBURST* signals will be low. At time 422, the rising edge of the BCLK signal, the BALE signals is lowered and the master units samples the EX32*, EX16* and SLBURST* signals and determines that a 16 bit device will be responding and that a burst operation can be performed.

At time 424, the falling edge of the BCLK signal, the master unit samples the EXRDY signal and determines that no wait states are necessary. At time 424 the LA<9-2> addresses are changed and, because no wait states are necessary, the MSBURST* signal is lowered, indicating that a burst operation will be occurring. This commences the address cycle of cycle AL. At time 426, the responding unit removes the data which it has been providing on the data bus, which data is latched by the master unit at this time. Also at time 426, the responding unit samples the MSBURST* signal and determines that a burst operation is occurring. At time 428, the master unit samples the EXRDY signal and determines that a wait state is not necessary. Additionally at this time, the master unit has determined that the next address to be addressed will not be in the same page as the previous operation and therefore the burst operation must be terminated. The MSBURST* signal is raised and the full address is presented on the LA<31-2> lines. At time 430, the rising edge of the BCLK signal, the master unit samples and latches in the data values which have been presented by the responding unit and sets the W-R signal at a high level to indicate a write operation. Further, the START* signal is lowered and the CMD* signal is raised to indicate the termination of a burst operation and the commencement of another operation. Finally at time 430, the responding unit samples the MSBURST* signal and determines that a burst is completed and therefore full address decoding is necessary. At time 432, the falling edge of the BCLK signal, the BALE signal is raised. Prior to the rising edge of the BCLK signal at time 434, the EX32*, EX16* and SLBURST* signals must be valid. In this case a 32 bit extended standard device is responding and it is burstable, so the EX32* and SLBURST* signals go low. At time 432, the master unit begins presenting the data on the data lines. At time 434, the BALE signal is lowered, the START* signal is raised and the CMD* signal is lowered. Additionally, the EX32*, EX16* and SLBURST* signals are sampled and it is determined that a 32 bit bursting, extended standard device is responding. At time 436, a new address is presented on the LA<9-2> lines and it is determined that a wait state is not necessary because the EXRDY signal is high. Additionally at this time, the MSBURST* signal is lowered to indicate to the responding unit that a burst cycle will be commencing. At time 438, the termination of the data phase of cycle AM, the MSBURST* signal is sampled by the responding unit and it is determined that a burst operation is occurring. Therefore, at this time the responding unit samples the data which has been presented on the data lines by the master unit, because the master unit changes the data at this time.

Proceeding to time 440, the next falling edge of the BCLK signal, the master unit samples the EXRDY line and determines that no wait states are to be added. At this time the master unit changes the LA<9-2> lines to present the next address, in this case the address of cycle AO. Proceeding to time 442, the next rising edge of the BCLK signal, the data is latched by the responding unit, and switched by the master unit. Also at this time the responding unit samples the MSBURST* signal to determine that a burst operation is continuing. At time 444, the falling edge of the BCLK signal, the LA<31-2> values are changed because the master is beginning an operation on a new page. Therefore at this time the MSBURST* signal is raised, with the SLBURST* signal rising in response to the change in the address. Additionally at this time, the master unit samples the EXRDY line and determines that a wait state is not necessary. At time 446, the rising edge of the BCLK signal and the termination of the data phase of cycle AO, the responding unit samples the MSBURST* line and determines that a burst operation has been completed. At this time the responding unit samples the data which had been presented by the master unit, which removes the data at this time. Also at this time the START* signal is made low and the CMD* signal is made high to indicate transition to the next cycle. Thus, it can be seen that a 16 bit extended standard master unit can perform burst operations in a manner similar to that of a 32 bit extended standard master unit and can utilize responding units of either 16 or 32 bits of width according to the extended standard.

Figure 5:
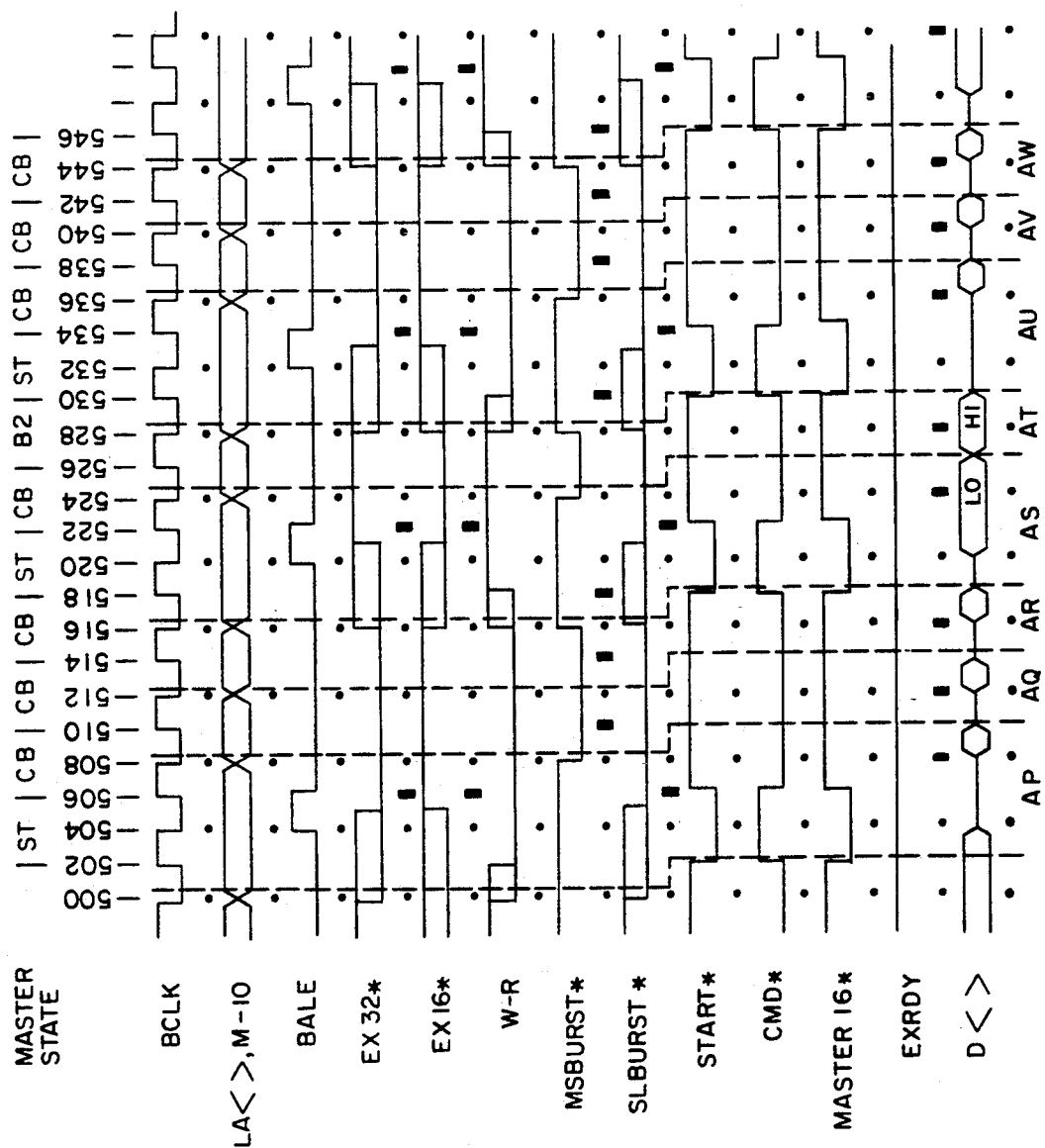
Figure 6:
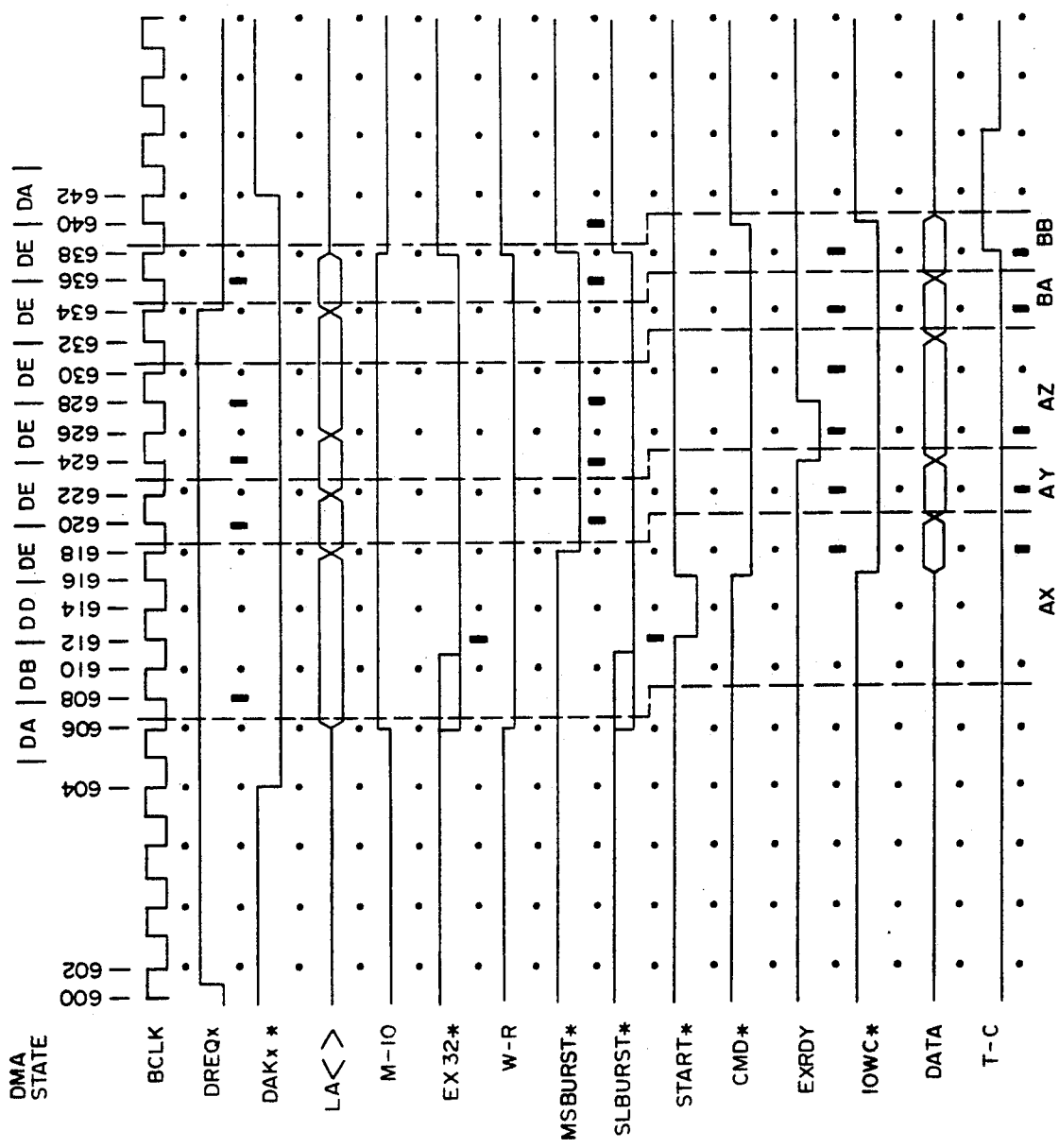

FIG. 5 shows the timing diagram for the response of a down shift extended standard master unit. A down shift or step down extended standard master unit is one that is 32 bits wide but which can operate with extended standard 16 bit devices for burst operations. While this step down master unit must therefore perform any necessary data translations between the high and low words of the 32 bit double word, both for reading and writing, this is preferable because burst operations can be performed, which are faster than allowing the system board to perform non-burst 16 bit extended standard operations and assemble the data into a 32 bit double word for presentation to the master unit. While such an assembly operation takes at least 5 BCLK signal cycles to transfer 32 bits of information, once a burst operation has commenced the same 32 bits can be transferred in 2 BCLK signal cycles using the 16 bit burst operation. Therefore, for extended burst operations it may be desirable that the master unit operate in down shift or step down mode to speed the overall data transfer. Because there must be a way to distinguish between a 16 bit extended standard master unit and a step down master unit, a step down master unit lowers the MASTER16* signal only when the START* signal is lowered, raising the MASTER16* signal at other times. This allows the system board data routing and conversion circuitry to determine that it need not operate even though an apparent mismatch is occurring between the master unit size and the responding unit size.

The first exemplary cycle commences at time 500, a falling edge of the BCLK signal, when the step down master unit presents the address on the LA<31-2> lines. On the next rising edge of the BCLK signal at time 502, the W-R signal is set low in the given example, the CMD* signal is raised and the START* and MASTER16* signals are lowered, indicating that a new cycle is commencing and that a step down master unit is present. At time 504, the falling edge of the BCLK signal, the BALE signal is raised and the data is removed from the data bus based on the previous write cycle. Prior to the next rising edge of the BCLK signal at time 506, the EX32*, EX16* and SLBURST* signals must be valid. In this case a 32 bit extended standard device is responding and it is capable of sustaining burst operations, so the EX32* and SLBURST* signals are low. At time 506 the three signals are sampled, the START* and MASTER16* signals are raised and the CMD* signal is lowered. At time 508, the master unit provides a new address on the LA<9-2> lines and lowers the MSBURST* signal, because the EXRDY signal is high, indicating that a wait state is not necessary. At time 510, the rising edge of the BCLK signal, the master unit reads the data which has been presented by the responding unit. Additionally, the responding unit samples the MSBURST* signal to determine that a burst operation is proceeding. At time 512, the falling edge of the BCLK signal, the master unit presents a new address on the LA<9-2> lines and samples the EXRDY lines to determine if wait states are needed. At time 514, the data is sampled by the master unit and removed by the responding unit. Additionally at this time, the MSBURST* signal is sampled by the responding unit to determine that a burst operation is continuing. At time 516, the master unit determines that the next address will be outside of the current page and therefore a full address must be presented. Therefore, this full address is presented on the LA<31-2> and BE*<3-0> lines and the MSBURST* signal is raised to indicate that the burst operation will not continue. At time 518, the rising edge of the BCLK signal, the final cycle AR of the burst operation is completing, with the master unit sampling the data which is then removed by the responding unit. Also at this time, the MSBURST* signal is sampled by the responding unit which determines that a burst operation is terminated. Additionally, the START* and MASTER16* signals are lowered and the CMD* signal is raised because a new cycle, in this case cycle AS, is proceeding.

At time 520, the BALE signal is raised and the data is presented to the data bus because this is a write operation. In this case prior to time 522, the rising edge of the BCLK signal, the EX16* and SLBURST* signals go low, indicating that a 16 bit extended standard device which can handle burst operations is responding. At time 522 the START* and MASTER16* signals go high, the CMD* signal goes low and the EX16*, EX32* and SLBURST* signals are sampled. In this case, the master unit will be required to step down to a 16 bit size to allow burst operation. At time 524, the next address is presented on the LA<9-2> lines by the step down master unit. In this case, the addresses may indeed be the same because if, for example, a full 32 bit double word had been requested and only 16 bits were being provided by the 16 bit device, the address would not change but only the BE*<3-0> lines would be changed at this time. Also at this time, the MSBURST* signal is lowered to indicate to the responding unit that a burst operation will be occurring. At time 526, the completion of the data phase of cycle AS and the rising edge of the BCLK signal, the responding unit samples the low double word which is presented by the step down master unit and samples the MSBURST* signal to determine that a burst operation is occurring. Also at this time the step down master unit begins presenting the high word which had previously been presented on the upper data lines onto the lower 16 data lines to allow the responding unit to properly handle the transfer. At time 528, the falling edge of the BCLK signal, the master device raises the MSBURST* signal because a new address will be presented which outside of the page boundary and the address is presented on the LA<31-2> and BE*<3-0> lines. At time 530, the completion of the burst cycle of cycles AS and AT, the high word data which has been presented by the master unit is sampled by the responding unit and the responding unit determines that the MSBURST* signal is high, indicating the end of a burst operation. Additionally at this time, the START* signal is lowered, the CMD* signal is raised and the MASTER16* signal is lowered, indicating the beginning of a new operation.

Cycles AU, AV and AW are similar to cycles AP, AQ and AR and proceed from time 530 to time 546. Thus, a step down master can perform 16 bit burst operations and 32 bit operations depending upon the size of the responding unit.

The timing cycles for DMA operations are shown in FIGS. 6, 7, 8 and 9 for memory read and write operations. The DMA device which is requesting service raises the DREQx line between times 600 and 602 to indicate to the DMA controller that service is needed. The BALE signal (not shown) is made high by the DMA controller to indicate to the ISA devices that the addresses which are appearing on the address lines are valid. The AEN signal (not shown) also goes high at this time to disable all I/O space operations except to the requesting DMA device. The DMA controller will pass all of the values appearing on the LA lines and the BE*<3-0> lines to the SA lines so that the address is always true on both busses, so that the appropriate memory units can determine their address and respond. The DMA controller priority resolving unit determines when it is appropriate to respond to the DMA request, at which time the DAKx* line for that particular DMA channel is made low. For the example shown as FIG. 4, this is to be considered time 604, which is a falling edge of BCLK signal. This initiates cycle AX at time 606, the next falling edge of the BCLK signal, which is an initial cycle of a DMA operation which will be performed in burst mode to 32 bit memory. The data will be transferred from the 32 bit memory to the requesting DMA device. At time 606, the DMA controller presents the address to the LA and BE* lines, which is automatically transferred over to the SA lines, and raises the M-IO signal to a high state to indicate that the memory space is desired to be accessed. The DMA device will interpret the IOWC* signal as it is operating in the I/O space and not memory space. At this time, the W-R signal is lowered to indicate that the memory will be read, but this signal change could wait one-half BCLK signal cycle. The addressed memory device will begin decoding the addresses presented and indicate whether it is 32 bit extended memory and whether it is capable of responding to a burst cycle. Proceeding to time 608, the rising edge of the BCLK signal, the cycle is continuing.

Proceeding to after time 610, the falling edge of the BCLK signal, the EX32* signal goes low indicating that a 32 bit extended standard memory unit will be responding and the SLBURST* signal goes low indicating that this particular unit can operate in burst mode. The DMA device is assumed to be burstable because of the programming of the DMA controller, so the SLBURST* signal is unambiguous. Proceeding to time 612 at the rising edge of the BCLK signal, the START* signal is made low and the EX32* and SLBURST* signals are sampled. The BCLK signal undergoes a high to low transition at time 614 and a low to high transition at time 616. At time 616, the START* signal is raised and the CMD* signal is made low to indicate that the address should be latched and the data cycle will be commenced. Also at time 616, the IOWC* signal is made low to indicate to the DMA device that valid data is beginning to appear on the data bus. The DMA device monitors the IOWR* and IORC* signals to determine the data direction of the DMA operation. This allows the memory devices to utilize the M-IO, W-R, START* and CMD* signals. The timing of the IOWC* signal is the same as the timing of the CMD* signal.

At time 618, the BCLK signal goes low. At this time, because the 32 bit memory read cycle is completing, the DMA controller asserts the next address on the LA<9-2> and BE*<3-0> lines to fully present the next address on the bus. Only the LA<9-2> and BE*<3-0> lines can be changed because a burst operation is commencing. At time 618 the DMA controller samples the EXRDY line to determine if a wait state is needed. In the illustrated case no wait states are necessary. At this time it is desired to start a burst cycle now that the memory location has been fully set up on the memory boards such that the row addresses have been fully stored and page mode operation of the DRAM's can begin. Therefore, the DMA controller lowers the MSBURST* signal to indicate that a burst cycle is commencing. This is the beginning of cycle AY. Proceeding to the next rising edge of the BCLK signal which occurs at time 620, the DMA device samples the data appearing on the data bus just before the memory device changes the data to that of the address currently being presented. This terminates the data portion of cycle AX and begins the first short burst cycle AY data portion. Also at time 620 the DMA device and the responding memory device sample the MSBURST* signal to determine that a burst operation is occurring.

Proceeding to the falling edge of the BCLK signal at time 622, the EXRDY line has not been asserted by the memory device or the DMA device and the next address is presented. Proceeding to time 624 where the BCLK signal undergoes a low to high transition, the data on the data lines is changed to reflect the new data that is present at the next address and the DMA device latches the data prior to the change. Beginning at this time and before the falling edge of the BCLK signal at time 626, the memory device asserts EXRDY low to indicate that it will not be able to respond in sufficient time and that a wait state is thus necessary. While adding wait states in a similar fashion can be done in non-DMA burst operations, it is generally not desirable because a non-DMA burst cycle with a wait state is the same length as a standard cycle. However, in DMA operations, a standard cycle is three or four BCLK signal cycles in length, and a burst cycle is one BCLK signal cycle in length, so wait states can be added and the resulting cycle times may still be improved over standard DMA cycle times. Additionally at time 624 the DMA device and the responding memory device sample the MSBURST* signal to determine that a burst operation is proceeding.

Then at time 626, the DMA controller asserts the next address and also recognizes the need for the wait state. The sequence then proceeds though the rising edge of the BCLK signal at time 628 and the falling edge at time 630. At time 628 the DMA device and the responding memory device sample the MSBURST* signal to determine if the address being presented is part of a burst operation. The sampling is done at this time because the new address has been presented. Prior to the falling edge at time 630, the memory device removed the EXRDY signal so that it returned to a high state, indicating that the device would be ready. This time essentially initiates the beginning of the address cycle for cycle AZ even though the address had previously been presented on the address lines at time 626. Proceeding to time 632, the rising edge of the BCLK signal, the data is latched and changed to proceed to the next cycle. At the falling edge of the BCLK signal at time 634, the address is again changed because the burst cycle is still continuing. Additionally at this time the DREQx signal is lowered and the T-C signal is raised, both indicating that the DMA cycle is completing. On the next edge of the BCLK signal at time 636, which is a rising edge, the data is latched and exchanged to that located at the presented address location and the responding memory device and the DMA device sample the MSBURST* signal. At time 638, the falling edge of the BCLK signal, the address lines are floated because this is the last cycle in the DMA transfer, which also causes the EX32* signal and SLBURST* signals to go high. The MSBURST* signal is raised by the DMA controller and the W-R and M-IO lines are floated to allow the next device to control this line. At time 640 the CMD* and IOWC* signals are raised to indicate that the data which is appearing on the data lines should be latched by the appropriate device and the data is removed. This completes data transfer cycle BB. To fully complete the DMA transfer operation at time 642, the BALE signal is lowered to indicate to ISA devices that addresses which appear on the bus are no longer valid, the AEN signal is lowered to allow I/O space operations to occur, the T-C signal is lowered and the DAKx* signal is raised to indicate the DMA cycle is completed.

Figure 7:
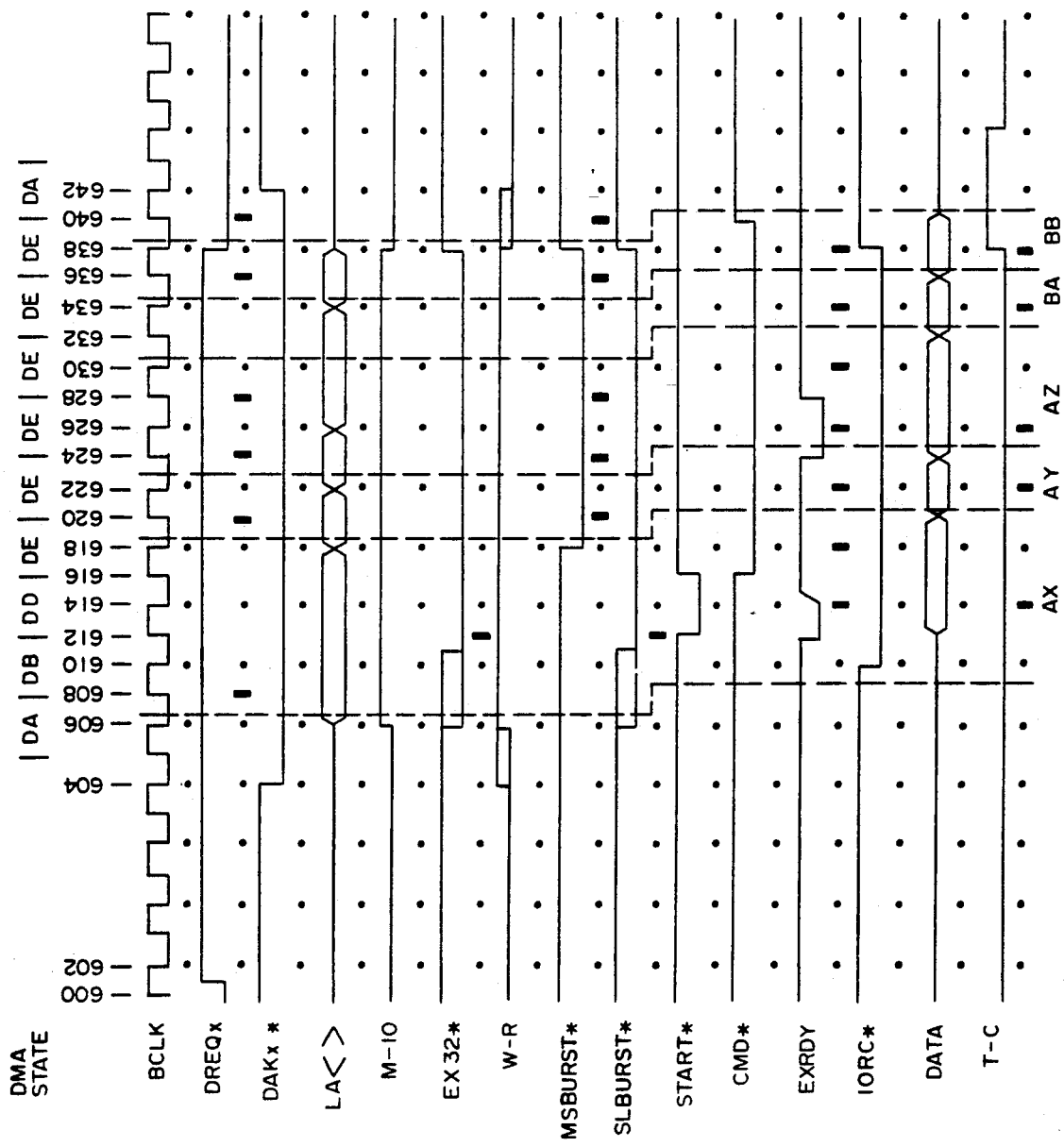

This has been basically an operation which transfers information from the memory to the DMA device, that is, a memory read and I/O write operation. FIG. 7 illustrates a memory write and I/O read situation wherein data is transferred from the DMA device to memory. The cycles are generally the same except that the W-R signal is in a high state to indicate a memory write instead of a low state which indicates a memory read. Additionally, the IORC* signal is utilized instead of the IOWC* signal and the EXRDY signal is driven during the regular cycle starting a burst operation. The IORC* signal is used to enable data from the DMA device onto the bus and therefore has different timing than the IOWC* signal. Specifically, the IORC* signal goes low at time 610, and at time 612 the data is presented to the data lines. The IORC* signal then remains low until time 638, at which time it is raised to indicate that the data will soon be removed from the data lines. The EXRDY signal is driven low by the DMA controller at time 612 to extend the DMA device's data presentation time during the first cycle. The EXRDY line is allowed to float high, as indicated by the slanted line, not driven high as is done in most instances so that should the memory device or DMA device need to add a wait state, there is not a signal level conflict. In other respects, the timings of FIG. 7, are similar to those of FIG. 6.

Figure 8:
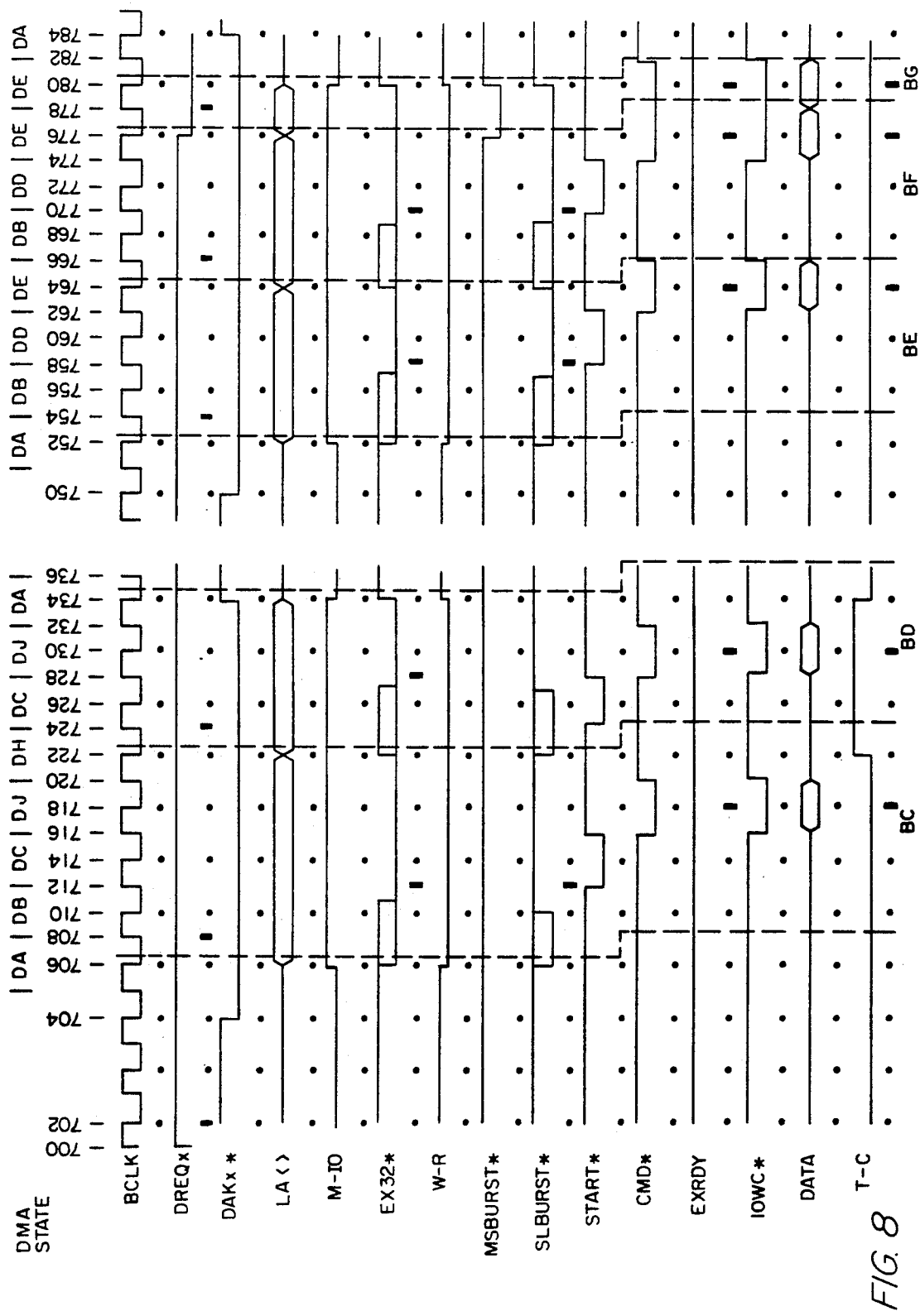
Figure 9:
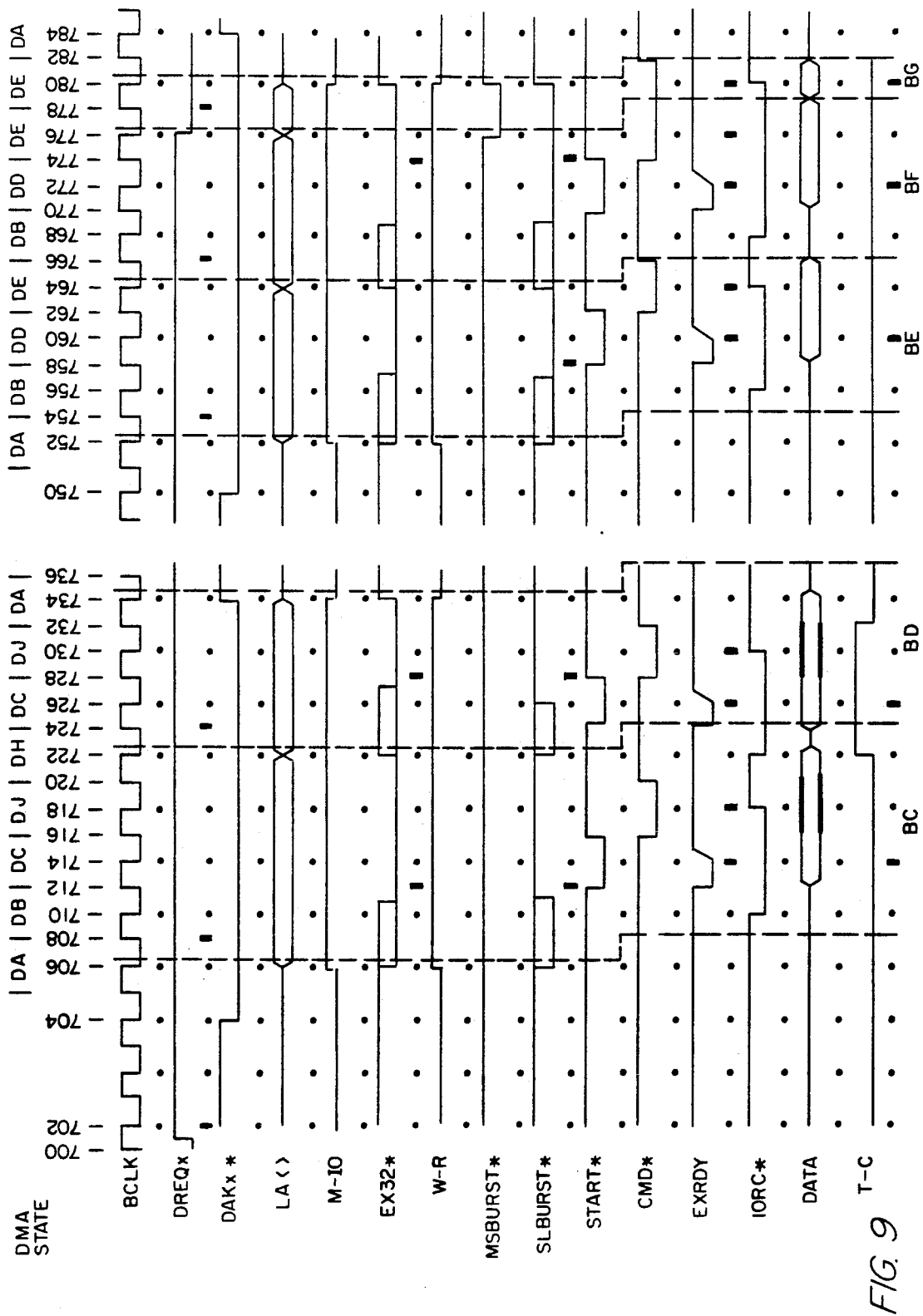

FIGS. 8 and 9 disclose various memory read and memory write cycles, with the first set being indicated for burst operation but where the responding memory device is not capable of burst operations, with the second set of operations being made to bursting memory. At a time between the rising edge of the BCLK signal at time 700 and the falling edge of the BCLK signal at time 702, the DREQx line is raised to indicate a DMA request by the DMA device. At time 704, a falling edge of the BCLK signal, the DAKx* signal goes low, indicating that the DMA request has been acknowledged and the cycle can proceed. At time 706, the next falling edge of the BCLK signal, the DMA controller presents the addresses on the LA<31-2> and BE*<3-0> lines and sets the M-IO line high and the W-R signal low to indicate that the memory is being read, thus indicating that the data is being written to the I/O space. At a time between time 706 and 712, the second rising edge of the BCLK signal, the EX32* and SLBURST* signal should be at their defined levels. At time 712, the START* signal is lowered to indicate the beginning of a cycle. At time 712, the EX32* and SLBURST* signals are sampled. In this case the EX32* signal is low indicating that a 32 bit extended standard memory device is responding but the SLBURST* signal is high, indicating that this device cannot burst. This example is provided to show the non-burst fallback timing of the preferred embodiment of the DMA controller.

At time 716, the next rising edge of the BCLK signal, the START* signal is raised, the CMD* signal is lowered and the IOWC* signal is lowered. Additionally, the data begins appearing on the data bus. At time 718, the falling edge of the BCLK signal, the EXRDY signal is sampled to determine if wait states are needed. In this case, no wait states are needed. At time 720, the rising edge of the BCLK signal, because no wait states are needed, this is the completion of the data transfer cycle and so the CMD* and IOWC* signals are raised and the data is removed from the data bus. At time 722, the falling edge of the BCLK signal, the next address is presented on the LA<31-2> and BE*<3-0> lines and the T-C signal is raised, indicating that this is the final transfer in the DMA operation. At time 724, the rising edge of the BCLK signal, the START* signal is lowered, indicating that the operation is commencing. At time 728, the next rising edge of the BCLK signal, the EX32* signal is sampled to determine the responding device width. In this case, a 32 bit device is responding. A further test is not made to determine if the responding device can perform burst operations because a DMA operation is sequential and when the first address is not burstable it is satisfactory for performance reasons to conclude that the remaining addresses in the transfer will not be burstable. This allows the transfers to be made in three BCLK signal cycles instead of four as would be necessary if a burst determination was made each transfer. Also at time 728, the START* signal is raised, the CMD* signal is lowered, the IOWC* signal is lowered and the data begins being presented by the memory device.

At time 730, the falling edge of the BCLK signal, the EXRDY line is sampled to determine if the wait states are necessary and the T-C line is sampled to determine if this is the final cycle. Because no wait states are necessary, at time 732, the rising edge of the BCLK signal, the CMD* and IOWC* signals are raised and the data is removed from the data lines. At time 734, the falling edge of the BCLK signal, the addresses are removed from the address lines, thus causing the EX32* signal to go high, the W-R signal is allowed to float and the T-C signal is lowered. In this case, the T-C signal has been used to indicate the end of the DMA cycle, which thus completes at time 734 and 736.

For purposes of this explanation, at time 750, a falling edge of the BCLK signal, the DAKx* signal goes low, indicating that a DMA request has been acknowledged. At time 752, the next falling edge of the BCLK signal, the DMA controller presents the address onto the LA<31-2> and BE*<3-0> lines. Additionally, the M-IO signal is raised and the W-R signal is lowered. Before time 758, the second rising edge of the BCLK signal, the responding unit must properly drive the EX32* and SLBURST* signals. In this case, the EX32* signal goes low and the SLBURST* signal goes low, indicating that a bursting 32 bit device will be responding. At time 758 the START* signal is lowered to indicate the beginning of cycle BE. At time 758, the EX32 and SLBURST* signals are sampled to determine if bursting can be performed and the size of the responding device. At time 762, the next rising edge of the BCLK signal, the START* signal is raised, the CMD* signal is lowered, the IOWC* signal is lowered and data is presented on the data lines. In this case, a burst operation will not be commenced because it is determined that the next address will be crossing over a page boundary and therefore no burst operation is initiated. Thus at time 764 a new set of address values is presented on the LA<31-2> and BE*<3-0> lines. Additionally, the EXRDY line is sampled to determine if wait states are necessary. In this case none are. Also at this time the T-C line is sampled to determine if the DMA cycle will be completing because this is the last piece of data to be transferred. Again in this case it is not. At time 766, the rising edge of the BCLK signal, the DREQx signal is sampled to determine if the cycle will be terminating because of removal of a DMA request. Also at time 766 the CMD* signal and the IOWC* signal are raised and the data is removed from the data lines. This completes the data portion of cycle BE and initiates the data portion of cycle BF.

The responding device must properly set the EX32* and SLBURST* signals between times 768 and 770. In this case it is done with both values being low. At time 770 the START* signal is lowered to indicate that a new cycle is commencing. At time 770 the EX32* and SLBURST* signals are sampled by the DMA controller to determine the size of the memory responding device and whether it is capable of responding in a burst. Again in this case it is a 32 bit device and it is burstable. At time 774, the next rising edge of the BCLK signal, the START* signal is raised, the CMD* signal is lowered and the IOWC* signal is lowered. Finally, data is presented onto the data bus at this time. At time 776, the next falling edge of the BCLK signal, the DREQx signal is removed, this being the method used to indicate the DMA request is no longer valid in this instance. Also at this time the EXRDY signal is sampled to determine if wait states are necessary. In this case none are. Additionally at this time the next address is presented on the LA<9-2> lines, this being appropriate because a burst operation will be performed. Finally at this time, the MSBURST* signal is lowered to indicate to the various devices that a burst operation is occurring.

At time 778, the data portion of cycle BF terminates and the data portion of cycle BG, a burst cycle, commences. At time 778 the DMA controller determines that the DREQx line has been lowered so that this is the final cycle of the operation. Also at this time the data is changed from the data bus to present that of the second value being transferred. Thus, in the case of a burst the DMA device cannot utilize the IOWC* rising edge to latch in the data, but must utilize the rising edge of the clock to latch the data. At time 780, because this is the termination of the DMA operation, the addresses are removed, causing the EX32* and SLBURST* signals to go high, and thus the MSBURST* signal to go high, the M-IO line is floated and the W-R line is floated. Additionally, the EXRDY signal is sampled to determine if a wait state is necessary. At time 782, the cycle BG data portion is completing with the CMD* signal and IOWC* signal raised and the data removed from the data lines. The DAKx* signal is raised in subsequent cycles.

The timing of the memory write operations in FIG. 9 are somewhat similar. In FIG. 9 the same cycles are shown for memory write and I/O read conditions. Generally, the timings of the signals are the same except for the EXRDY signal, the presence or use of the IORC* signal instead of the IOWC* signal, which additionally has different timing and the driving source of the data line during certain portions of the operations. At time 710 the IORC* signal is lowered in cycle BC so that the data can begin appearing from the DMA device. At time 712, the DMA controller lowers the EXRDY signal for one-half of a BCLK signal cycle to cause the DMA device to apply a single wait state to allow the data to be present one additional BCLK signal cycle. Also at this time it is assumed that the data begins appearing on the data lines from the DMA device. At time 714, the falling edge of the BCLK signal, the DMA controller removes the driving source from the EXRDY line, allowing the line to float high so that conflicting drives are not present if the responding memory unit must drive the EXRDY signal. An additional difference in this cycle is that beginning at approximately time 716 the system board begins driving the data lines with the same value as those presented by the DMA device. In this case it is necessary because the data will not be present on the data lines for a sufficiently long time for the memory device to record them and so two different driving units must be utilized. This overlap is acceptable and conflicts do not occur because the system board is driving the lines at the same level as the DMA device and therefore no significant problems occur. At time 718, the IORC* signal is raised to indicate that the DMA device can stop providing data to the data bus. The data is then presented by the system board until time 722, at which time it is removed. Thus the data available is presented for a slightly extended period so that it is properly present until at least the CMD* signal is raised and preferably one-half BCLK cycle past that for conventional memory write operation timing.

Because the second operation is commenced at times 722 and 724, at time 722 the IORC* signal is again lowered so that the next address being presented is utilized for developing the data which is presented to the data lines. The EXRDY signal is lowered at time 724 to provide a one wait state extension of the DMA device operation. At time 726 the DMA controller allows the EXRDY line to float high. At times 728 to 730, the system board latches and begins driving the data lines to the appropriate values so that when the IORC* line is removed at time 730, the data can be presented until time 734 for proper write cycle operations to the memory.

These timings differ somewhat for write cycle burst operations as shown in FIG. 9. For example, the IORC* line goes low at time 756 and the EXRDY line goes low at time 758. Additionally, the data is presented by the DMA device at time 758 onto the bus and removed at time 766. The EXRDY signal is released by the DMA controller at time 760 and the IORC* signal is raised at time 764. Similarly, in cycle BF the IORC* signal is lowered at time 768, the EXRDY signal is lowered at time 770 and released at time 772, with the data being presented from time 770 to time 778. The system board does not drive the data lines during the first cycle in the burst operation because the data need only be presented for two BCLK signal cycles, not three as in the non-burst case. The final portion of data is provided from time 778 to time 782. The IORC* signal is raised at time 780 to indicate the end of the transfer cycle.

Figure 10:
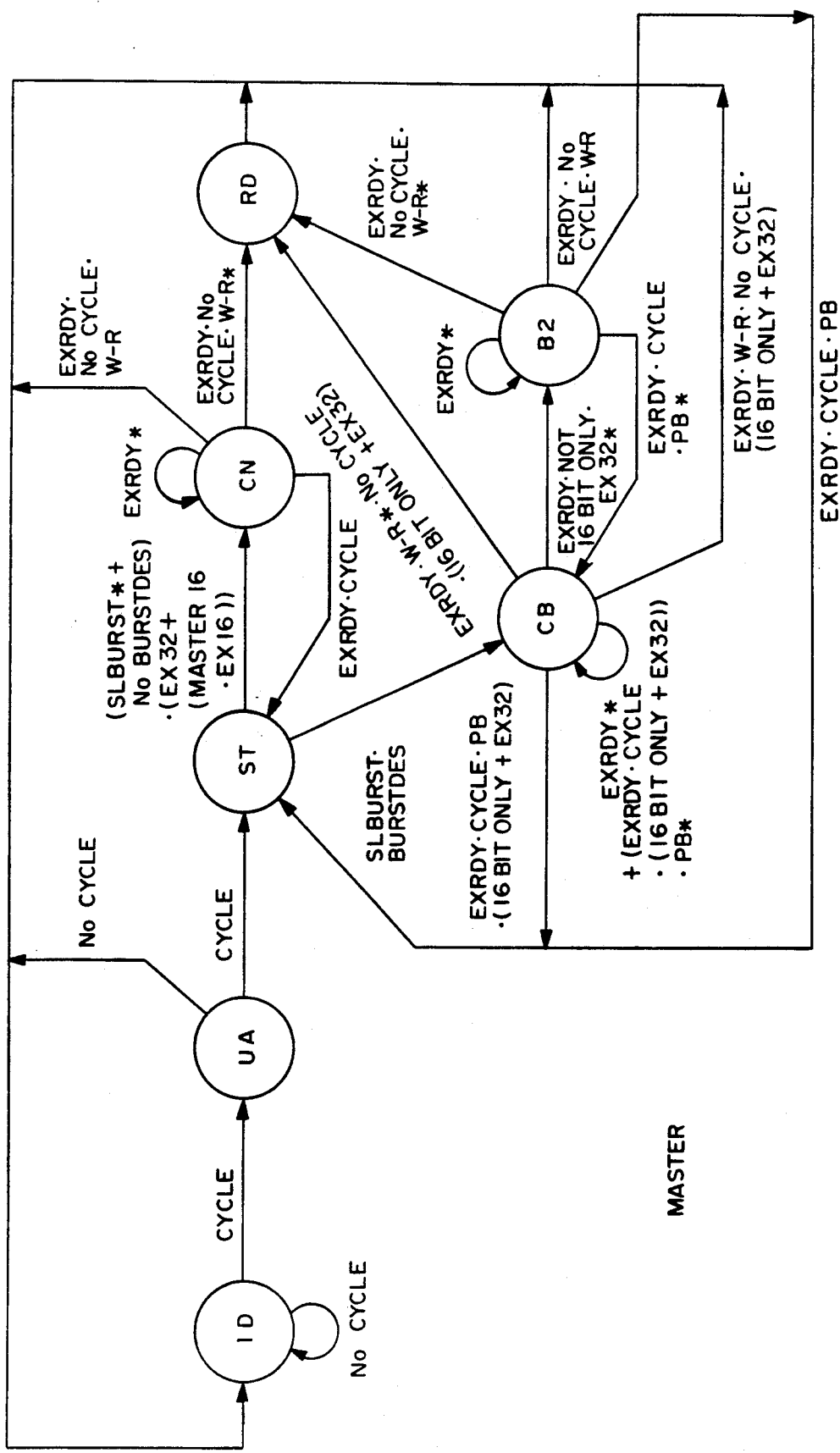
FIG. 10 is a state diagram indicating the operations of portions of the circuitry of a master unit in a computer system incorporating the present invention.
Figure 11:
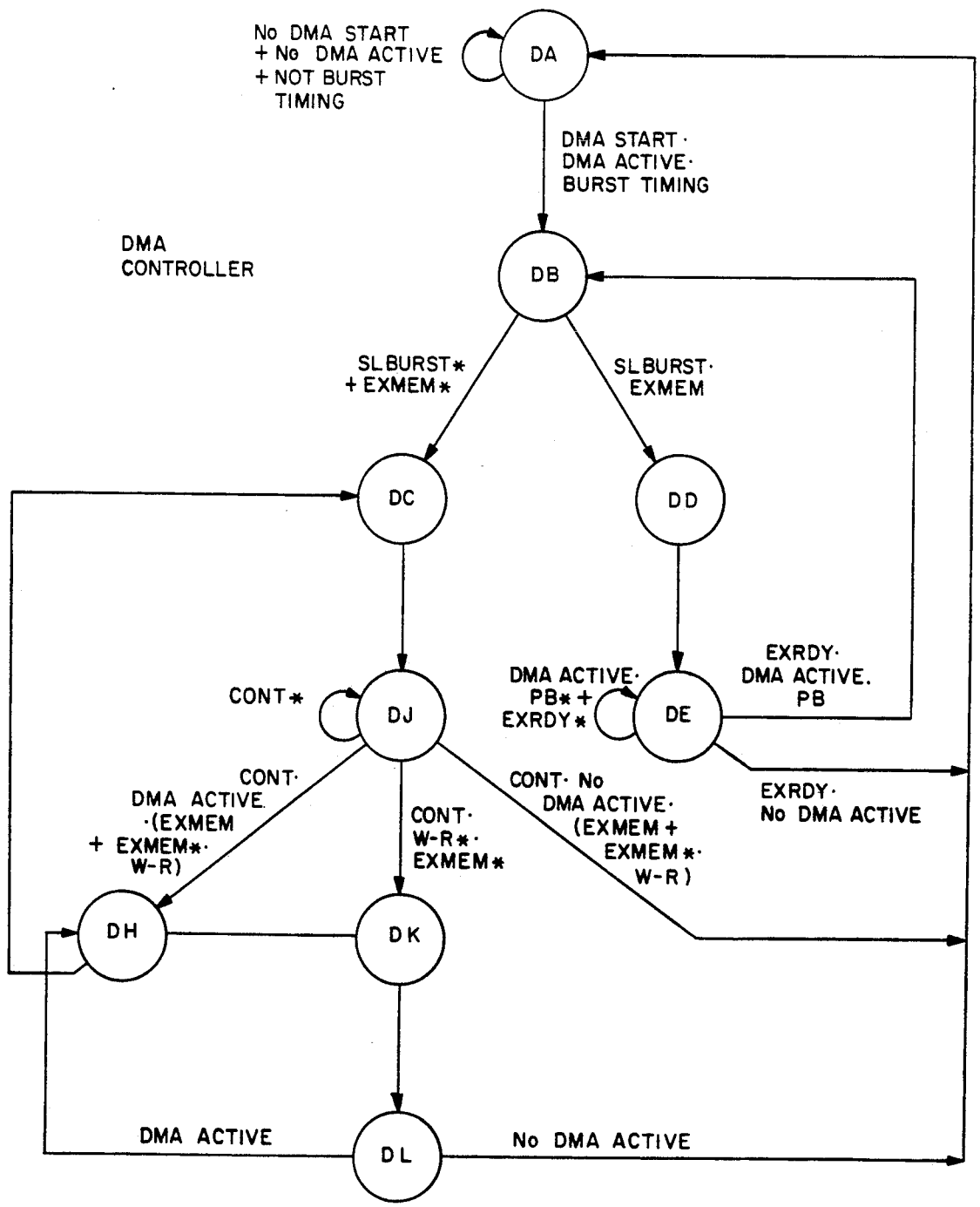
FIG. 11 is a state diagram indicating the operations of the circuitry of a direct memory access controller.
Figure 12:
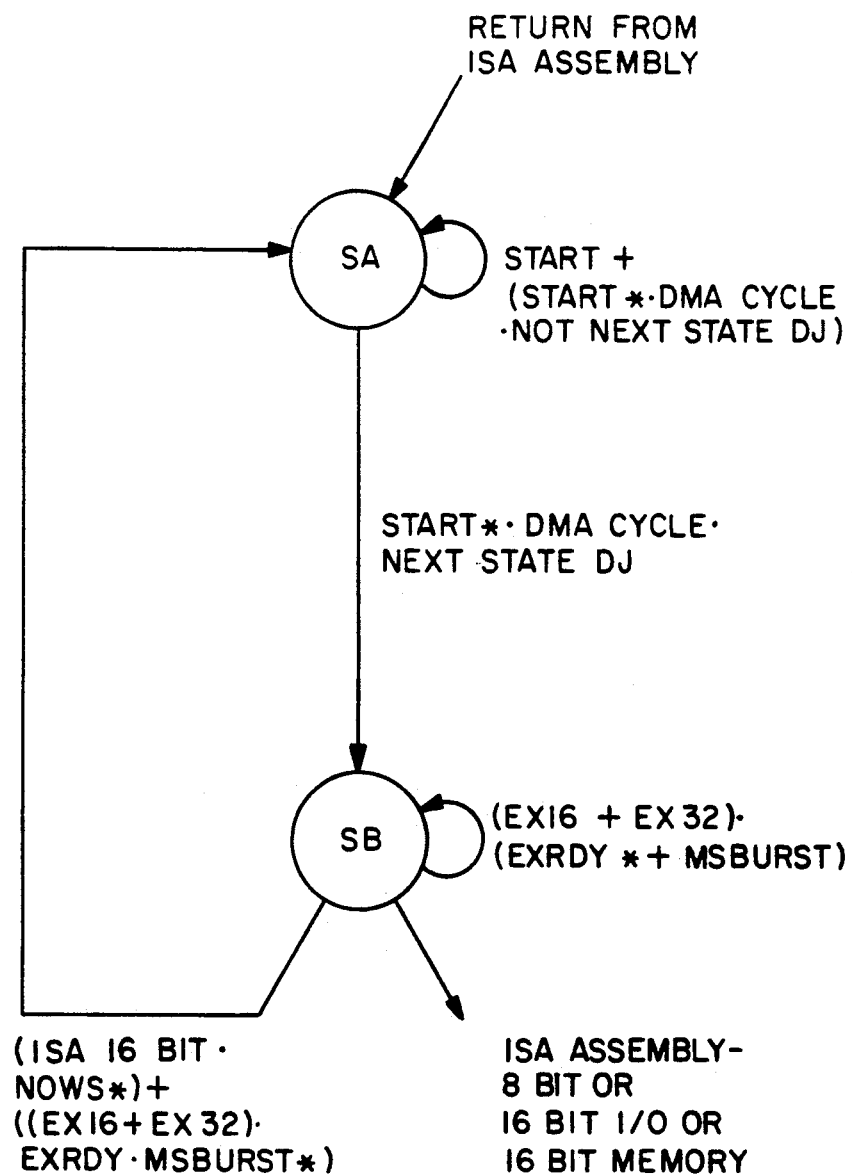
FIG. 12 is a state diagram indicating the operations of portions of the circuitry of a system board when cooperating with a master unit or direct memory access controller in a computer system incorporating the present invention.

Exemplary state machines which can perform the burst operations as required are illustrated in FIGS. 10, 11 and 12. FIG. 10 is a state machine for a master unit which desires to do a transfer to or from memory, and FIG. 12 illustrates a state machine for the system board. FIG. 11 illustrates a state machine for a DMA controller handling DMA transfers between particular DMA devices in the I/O space and extended memory devices.

An exemplary state machine diagram showing the operation of the master unit is illustrated in FIG. 10. In explanation of the state machine diagram, branching or transfer conditions from a given state, which must be true at the next rising edge of the BCLK signal, are indicated next to the branch. All transitions in the state machine of FIG. 10 are made on the rising edge of the BCLK signal. The master unit operation begins at state ID, where the state machine is in idle condition because no cycle is being performed, for example when the master unit is not in control of the bus. In state ID the master unit is floating all of its outputs because it is not in control of the bus. Control stays at state ID as long as there is no cycle being performed by the master unit. However, when the master unit does obtain control of the bus this is indicated by the presence of a CYCLE signal, so that at the next rising edge of the BCLK signal control transfers to state UA. In state UA the master unit is coming into control of the bus and after the falling edge of the BCLK signal, the master unit presents the address on the LA<31-2> and BE*<3-0> lines and presents the M-IO and W-R signals. If there is no cycle being performed, control transfers from state UA to state ID and the master unit goes back into the idle condition.

If the master unit is to continue the cycle, control transfers from state UA to state ST, the start state. During state ST, the master unit drives the START* signal low and the MASTER16* signal low if bursting is desired. If the previous cycle was a read operation, on the rising edge of the BCLK signal at the beginning of the state ST, the master unit latches in the data present on the data lines from the previous read operation to complete the read operation. If a write operation is being performed, the master unit presents the data on the data lines on the falling edge of the BCLK signal. There are illustrated in FIG. 10 two transfers from the state ST. One transfer occurs under conditions where burst operations will occur, and one where compatible length, extended, non-burst cycles will be performed. A third branch, not shown, is taken when data assembly, disassembly or transfer is required.

If this is a normal cycle which is being responded to by a properly sized extended standard slave unit, so that no data assembly or transfer is required, and the SLBURST* signal is high because the responding unit cannot burst or a burst operation is not desired, control proceeds from state ST to state CN. This condition is determined by the fact that the SLBURST* or NOBURSTDES signals are high and the EX32* signal or a combination of the MASTER16* and EX16* signals are low. In state CN, the master unit drives the START* and MASTER16* signals high and samples the EXRDY signal on the falling edge of the BCLK signal. Additionally in state CN the next address is provided after the falling edge of the BCLK signal. The sampling of the EXRDY signal is done so that the state machine can loop on the state CN until the slave unit indicates that it is ready. If the slave unit is indicating that it is ready, control transfers from state CN to one of three different states. If the master unit cycle is to continue, control returns to state ST. If there is no cycle to continue and a write operation has been occurring, as indicated by the level of the W-R signal being high, control returns to state ID. If no cycle is to be performed and a read operation has been occurring, control transfers to state RD. In state RD, the data from the read operation is latched on the rising edge of the BCLK signal and the master unit removes itself from the bus by floating all of the outputs on the rising edge of the BCLK signal. Control transfers from state RD to state ID in all cases.

If, however, a burst operation was desired and the responding unit was capable of bursting, as indicated by the SLBURST* signal being low and the BURSTDES signal being high, control proceeds to state CB. State CB is the primary burst state. Upon leaving state ST the START* and MASTER16* are raised by the master unit. On the falling edge of the BCLK signal during state CB the next address is presented. If a write operation is occurring, upon entry to state CB the next set of data values is presented by the master unit. If a read operation is occurring the data is stored on the rising edge of the BCLK signal when transferring from state CB. There are five possible transfers from state CB. State CB transfers back to itself if the EXRDY signal is low, that is, the EXRDY* signal is true, or if the EXRDY signal is high, a cycle is to be performed, either the EX32* signal is low or only 16 bits are being transferred and the next address does not result in a page break. This thus is the standard cycle in which a burst operation loops, thus allowing the one BCLK signal cycle to be developed. The address is presented on the falling edge of the BCLK signal in state CB. External of the logic of the state machine is the logic required to increment or change the address which is presented on the burst cycles. This can be done as is appropriate for the desired device. If the EXRDY signal is high, a cycle is desired, the next address will result in a page break, and a 32 bit extended device has responded or only 16 bits need to be transferred, control proceeds to state ST for a full cycle to set up the full address.

If the responding device is a 16 bit extended standard device and the master unit must downshift and perform two 16 bit burst transfers, then when the EXRDY signal is high, the EX32* signal is high and a signal referred to as NOT 16 BIT ONLY, which indicates that 24 or 32 bits of data are to be transferred, is true, then control transfers from state CB to state B2. State B2 is the second cycle of an operation which occurs when the responding device is a 16 bit burstable device and the master unit downshifts to perform the burst. In state B2 only the BE*<3-0> signals need to be changed to develop the address of the second word to be transferred. This change is done on the falling edge of the BCLK signal in state CB. On the falling edge of the BCLK signal in state B2 the next address values are provided. If a write operation is occurring the master unit presents the next data values, the high word values, for storage by the responding memory unit. If a read operation is occurring. the presented data is stored on the rising edge of the BCLK signal when transferring from state B2. State B2 also has five possible transfers. State B2 transfers to itself if the EXRDY signal is low, thus adding capability for wait states. If a cycle is to continue, the EXRDY signal is high and a page break will not occur at the next address, then control proceeds to state CB so that another operation can be performed. If the cycle is to continue, the EXRDY signal is high and a page break will occur at the next address, control returns to state ST for a new START* signal. If no cycle is to be performed, the EXRDY signal is high and the operation is a write operation, then control proceeds to state ID. If no cycle is to be performed, the EXRDY signal is high and the operation is a read operation, then control proceeds to state RD for reasons stated above.

If, while control is in state CB, at the next rising edge of the BCLK signal, the EXRDY signal is high, a write operation was being performed, no cycle was to occur and either the EX32* signal was low or only 16 bits was to be transferred, then control transfers to state ID. If, however, a read operation had been occurring, control proceeds to state RD to complete the read operation.

Therefore a master unit can perform cycles for a burstable responding unit which is the proper width, can downshift for 16 bit extended standard devices and can perform non-burst cycles when either no bursts are desired as in page miss operations or the slave or responding unit cannot burst.

In an alternate embodiment of the master state machine, the definition of the CYCLE signal could be redefined. If a page break would occur, this could be considered the end of a cycle. In that case the feedback paths from states CB and B2 to state ST would not exist. This definition of termination of a cycle would allow more frequent arbitration for the bus to occur and for that reason might be desirable. If the feedback paths from states CB and B2 were eliminated then the timing diagrams would not be as they appear in FIGS. 2-5 when a page break is occurring but would instead be returned to an arbitration mode where the bus is released and a new arbitration cycle is requested.

An exemplary DMA controller state machine is shown in FIG. 11. The state machine is advanced on the rising edge of the BCLK signal, starts at state DA and stays at state DA as long as a DMA cycle is not starting, a DMA cycle is not active or the DMA channel is not set for burst timing. The initial address is provided by the DMA controller on the falling edge of the BCLK signal during the last period in state DA. When the DMA cycle is starting, the DMA cycle is active and burst timing is programmed, control proceeds to state DB. If a memory write operation is occurring the DMA controller lowers the IORC* signal at the falling edge of the BCLK signal during state DB. There are two exits from state DB which are based on whether the responding memory unit is capable of bursting. If the memory unit cannot burst as indicated by the SLBURST* signal being high or an EXMEM* signal being high, this signal being a combination of the EX32* signal if 32 bit wide transfers are requested and the EX16* if 16 bit wide transfers are requested, then control proceeds to state DC. At state DC the DMA controller lowers the START* signal. Control transfers from state DC to state DJ, with the DMA controller raising the START* signal on the rising edge of the BCLK signal when the transfer occurs. If a memory write operation is occurring the IORC* signal is raised on the falling edge of the BCLK signal during state DJ.

If a memory read operation is occurring, the IOWC* signal is lowered on the rising edge of the BCLK signal when entering state DJ, unless a data assembly cycle is required, where the IOWC* signal remains high until the data is fully assembled and redriven onto the data bus. Control remains in state DJ if it is determined that a data assembly cycle is required. This is indicated by the CONT* signal being high, which indicates that it is not time for the cycle to continue. As soon as it is time for the cycle to continue, such as when an extended standard memory device is responding or the system board has completed the assembly operation, then control proceeds to one of three different states. If a memory read operation is occurring the IOWC* signal is raised on the rising edge of the BCLK signal when transferring from state DJ, unless the data has to be redriven onto the data bus because an assembly or translation operation was required.

If the DMA cycle is no longer going to be active and either a proper width extended memory device has responded or the cycle is a memory write cycle and an ISA standard device responded, then control proceeds to state DA. If a properly sized extended memory device had not responded and the cycle is a read cycle, then control transfers to state DK to perform the redrive operation which presents data which had been assembled by the system board onto the data bus. Control proceeds from state DK to state DL on the next rising edge of the BCLK signal. Upon entry to state DL the IOWC* signal is lowered. The IOWC* signal is raised on the rising edge of the BCLK signal when transferring from state DL. Control transfers from state DL to state DA if the DMA cycle is no longer active or to state DH if the DMA cycle is continuing to be active so that more transfers will occur. State DH is also where control transfers from state DJ if the DMA cycle is still active and either a proper width extended memory device has responded or it is a write cycle and an ISA standard device has responded. The next address is placed on the address lines at the falling edge of the BCLK signal during state DH and at that time the IORC* signal is lowered if the cycle will be a memory write cycle. Control proceeds from state DH to state DC to continue the transfer operations. Therefore the fallback transfer timing when the DMA controller is programmed for burst operations and they cannot be performed has a first cycle 4 BCLK signal cycles long and remaining cycles 3 BCLK signals cycles long.

If, the responding memory unit is an extended standard unit that can burst, as indicated by the SLBURST* signal being low and the appropriately sized extended standard memory feedback signal being low, control transfers from state DB to state DD, where the START* signal is lowered by the DMA controller. After one BCLK signal cycle in this state the START* signal is raised and control transfers to state DE. On the falling edge of the BCLK signal in state DE the next address is presented by the DMA controller. The CMD* signal is kept low by the DMA controller while the state machine is in state DE. The IORC* signal is raised on the falling edge of the BCLK signal in the last state DE of the burst cycle if a memory write operation is occurring. If a memory read is occurring, the IOWC* signal goes low upon entry to state DE and goes high when state DE is exited. Control remains at state DE if the DMA cycle is continuing to be active and there is not a page break or if the EXRDY signal is low. Thus state DE is where the state machine resides during burst operations and during wait state operations. If the DMA cycle is continuing, the EXRDY signal is high and a page break will be occurring, that is the next address to be presented is beyond the page boundary, then control proceeds from state DE to state DB so that the full address can be properly presented to the responding device. If the EXRDY signal is high and the DMA cycle will not be active or continuing , then control proceeds from state DE to state DA. Thus during burst operations data is transferred in one BCLK signal cycle, with three BCLK signal cycles being used when the full address must be set up.

The final state machine of interest which is utilized in a system incorporating the present invention is a system board state machine, which for purposes of this description, has two states which need to be defined. The first state is state SA, which is effectively the idle state of the machine. Control loops at state SA while the START* signal is low or while the START* signal is high, a DMA cycle is occurring and the next state in the DMA state machine is not state DJ. If the START* signal is high, a DMA cycle is present and the next state of the DMA state machine is state DJ, then control transfers to state SB. Control loops at state SB if either of the EX16* or EX32* signals are low and either of the EXRDY or the MSBURST* signals are low. Thus, if either width extended standard memory size device is responding and it is either not ready or a burst cycle is in progress, control remains in state SB. Control transfers from state SB to an ISA assembly portion (not shown) if an 8 bit device is responding, if a 16 bit ISA standard I/O device is responding or if 16 bit ISA standard memory device is responding. The return from the ISA assembly section of the state machine is a return to state SA after the appropriate cycles have been completed. The other exit from state SB occurs if it is a 16 bit ISA standard device and the NOWS* signal is low or if either the EX16* or EX32* signals are low, the EXRDY signal is high and the MSBURST* signal is high. These conditions indicate that the responding memory device is prepared to complete its operations at this time, so a transfer is appropriate to state SA where the next cycle can proceed. The system board state machine drives the CMD* signal low when the state machine is in state SB.

The various states of the master unit state machine and the DMA controller state machine are present on the appropriate figures so that the operation of the state machines in relation to the timing diagrams can be easily traced.

Thus it can be seen that the present invention provides for a computer system which has a very high data transfer rate under certain modes, significantly higher than the standard rates for either master unit memory operations or DMA operations.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

I claim:

1. A method of transferring data between a memory and a circuit board in a computer system at a first standard transfer rate and a second standard transfer rate, the computer system including a system board having a plurality of locations for inclusion of interchangeable circuit boards, the circuit board locations being interconnected by a series of lines on the system board forming data, address and control busses, the data lines forming a plurality of different data widths, with the memory connected to the system board and with the data, address and control lines being coupled to the memory, the computer system further including a means for providing a synchronizing signal, with the synchronizing signal being provided to each location, the method comprising:

transferring data of a desired maximum width between the memory and an interchangeable circuit board in a circuit board location at the first standard transfer rate and sequence defining a cycle, wherein first address values are provided by the circuit board on a first given direction edge of the synchronizing signal and the first address values are removed by the circuit board on said same synchronizing signal direction edge following at least two synchronizing signal cycles, with the first data values being provided after the providing of the first address values and being removed at approximately the opposite direction edge of the synchronizing signal following the removal of the first address values;

transferring data of said desired maximum width between the memory and the circuit board at the second standard transfer rate and sequence defining a cycle after completion of a cycle at the first standard transfer rate and sequence or a cycle at the second standard transfer rate and sequence, the address values for said second standard transfer rate cycle being within a defined range of the first address value of said first standard transfer rate cycle, wherein the address values are provided by the circuit board for a single synchronizing signal cycle, said address values changing on the same direction edge as the providing of the first address values of the first standard transfer rate cycle, with the data values being removed at approximately the opposite direction edge of the synchronizing signal following a full synchronizing signal cycle after the providing of the second address value; and transferring data having a maximum width less than said desired maximum width between the memory and the circuit board at the second standard transfer rate and sequence after completion of a cycle at the first standard transfer rate and sequence or a cycle at the second standard transfer rate and sequence, wherein each of the transfers of data may be of a designated combination of portions of the particular maximum width of the transfer.

2. The method of claim 1, further comprising:
the circuit board indicating that transfer according to the second standard transfer rate and sequence is desired prior to or contemporaneous with commencing the second standard transfer rate transfers.

3. The method of claim 1, further comprising:
the memory indicating that the second standard transfer rate may be utilized after receiving said first address values.

4. The method of claim 3, further comprising:
the circuit board indicating that transfer according to the second standard transfer rate and sequence is desired prior to or contemporaneous with commencing the second standard transfer rate transfers.

5. The method of claim 1, further comprising:
the memory indicating that either the first or second standard transfer rate is too great for data transfer and wherein the first or second standard transfer rate is reduced and portions of said first or second standard transfer sequence are delayed upon indication that the first or second standard transfer rate is too great.

6. The method of claim 1, further comprising:
performing a data transfer according to the first standard transfer rate and sequence after a data transfer according to the second standard transfer rate and sequence when the address value of the next data transfer is outside of said defined range.

7. The method of claim 1, wherein the memory includes page mode dynamic random access memories and said defined range for second standard transfer rate and sequence operations is the size of a page of the dynamic random access memories.

8. The method of claim 1, further comprising:
providing a signal on said control lines during a first standard transfer rate cycle indicating start of a transfer cycle;
removing said start indication signal and contemporaneously providing a signal on said control lines during the first standard transfer rate cycle indicating continuation of the transfer cycle;
maintaining the states of said start indication signal and said combination indication signal during second standard transfer rate cycles; and
removing said continuation indication signal at the completion of the second standard transfer rate cycles.

9. The method of claim 8, further comprising:
removing said continuation indication signal at the completion of a first standard transfer rate cycle not followed by a second standard transfer rate cycle.

10. The method of claim 8, wherein said start indication signal is provided on the next edge of said synchronization signal after providing of the address values, said start indication signal is removed and said continuation indication signal is provided on the same synchronization signal edge following one synchronizing signal cycle, and said continuation indication signal is removed on the same synchronization signal edge following at least one synchronizing signal cycle.

11. The method of claim 1, further comprising:
the circuit board indicating that transfers having a maximum width less than the desired maximum width according to the second standard transfer rate and sequence may be performed prior to commencing the second standard transfer rate transfers having a maximum width less than the desired maximum width.

* * * * *

UNITED STATES PATENT AND TRADEMARK OFFICE
CERTIFICATE OF CORRECTION

PATENT NO.    : 5,159,679
DATED         : October 27, 1992
INVENTOR(S)   : Paul R. Culley It is certified that error appears in the above-identified patent and that said Letters Patent is hereby corrected as shown below:

In Col. 30, Line 27, please replace "operations" with --operation--.

Signed and Sealed this

Twelfth Day of October, 1993

Attest:

BRUCE LEHMAN

*Attesting Officer*       *Commissioner of Patents and Trademarks*